(12) United States Patent
Lee et al.

(10) Patent No.: US 10,129,721 B2
(45) Date of Patent: Nov. 13, 2018

(54) METHOD FOR SUPPORTING SITUATION SPECIFIC INFORMATION SHARING AND ELECTRONIC DEVICE SUPPORTING THE SAME

(71) Applicant: Samsung Electronics Co., Ltd., Gyeonggi-do (KR)

(72) Inventors: Ju Ah Lee, Gyeonggi-do (KR); Hyuk Kang, Gyeonggi-do (KR); Su Hyun Kim, Gyeonggi-do (KR); Jun Hak Lim, Gyeonggi-do (KR); Young Jae Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 196 days.

(21) Appl. No.: 14/987,865

(22) Filed: Jan. 5, 2016

(65) Prior Publication Data
US 2016/0197987 A1 Jul. 7, 2016

(30) Foreign Application Priority Data

Jan. 6, 2015 (KR) .................. 10-2015-0001458

(51) Int. Cl.
*H04L 29/08* (2006.01)
*H04W 4/60* (2018.01)
(Continued)

(52) U.S. Cl.
CPC ............. *H04W 4/60* (2018.02); *H04L 67/104* (2013.01); *H04W 4/003* (2013.01); *H04W 4/006* (2013.01);
(Continued)

(58) Field of Classification Search
CPC .... H04L 67/104; H04W 4/003; H04W 4/023; H04W 76/02; G06F 17/30058
(Continued)

(56) References Cited

U.S. PATENT DOCUMENTS 7,318,086 B2 * 1/2008 Chang .................. G06F 3/1204
358/1.15
8,997,167 B1 * 3/2015 Bliss .................. H04N 21/4223
725/115
(Continued)

FOREIGN PATENT DOCUMENTS

JP         2011-228787 A     11/2011
KR    10-2007-0037780 A      4/2007
(Continued)

OTHER PUBLICATIONS

Chong MK, Gellersen H. Usability classification for spontaneous device association. Personal and Ubiquitous Computing. Jan. 1, 2012;16(1):77-89.*

(Continued)

*Primary Examiner* — Ranodhi Serrao
*Assistant Examiner* — James N Fiorillo
(74) *Attorney, Agent, or Firm* — Cha & Reiter, LLC

(57) ABSTRACT

An electronic device and a method for supporting situation specific information sharing in order to more accurately and conveniently check user information. The electronic device shares information to be output according to each situation. The electronic device includes: a memory configured to store collection information; and a processor electrically connected to the memory, wherein the processor controls a status of an output device that outputs the collection information, controls transmission of the collection information to the output device, and display of the collection information by the output device.

19 Claims, 15 Drawing Sheets

(51) Int. Cl.
  *H04W 4/38* (2018.01)
  *H04W 4/80* (2018.01)
  *H04W 4/00* (2018.01)
  *G06F 17/30* (2006.01)

(52) U.S. Cl.
  CPC ............ *H04W 4/008* (2013.01); *H04W 4/38* (2018.02); *H04W 4/80* (2018.02); *G06F 17/30058* (2013.01)

(58) Field of Classification Search
  USPC .......................................... 709/204, 217, 209
  See application file for complete search history.

(56) References Cited

U.S. PATENT DOCUMENTS

| | | | |
|---|---|---|---|
| 9,144,405 B2 | 9/2015 | Kim et al. | |
| 9,554,262 B2* | 1/2017 | Johnsson | H04W 8/005 |
| 2005/0289264 A1* | 12/2005 | Illowsky | G06F 1/3203 710/104 |
| 2010/0095332 A1* | 4/2010 | Gran | G06F 17/30038 725/93 |
| 2010/0201203 A1* | 8/2010 | Schatz | H01Q 7/00 307/104 |
| 2010/0217837 A1* | 8/2010 | Ansari | G06Q 30/04 709/218 |
| 2011/0169654 A1* | 7/2011 | Ketari | G08B 13/1427 340/687 |
| 2012/0210205 A1* | 8/2012 | Sherwood | G06F 17/30058 715/234 |
| 2013/0034306 A1* | 2/2013 | Ivanov | H04N 21/42202 382/224 |
| 2013/0057660 A1 | 3/2013 | Kim et al. | |
| 2013/0091213 A1* | 4/2013 | Diab | G06Q 50/01 709/204 |
| 2013/0127980 A1* | 5/2013 | Haddick | G06F 3/013 348/14.08 |
| 2013/0308506 A1* | 11/2013 | Kim | H04W 76/023 370/310 |
| 2014/0189513 A1* | 7/2014 | Dua | G06F 17/30058 715/716 |
| 2014/0196140 A1* | 7/2014 | Gong | H04L 67/104 726/10 |
| 2014/0280581 A1* | 9/2014 | Hernandez | H04L 29/08072 709/204 |
| 2014/0309790 A1* | 10/2014 | Ricci | H04W 4/21 700/276 |
| 2014/0347565 A1* | 11/2014 | Fullam | H04N 5/607 348/738 |
| 2015/0312394 A1* | 10/2015 | Mirza | H04M 1/7253 455/420 |
| 2015/0327312 A1* | 11/2015 | Burbidge | H04W 72/14 370/329 |
| 2015/0350690 A1* | 12/2015 | Zerr | H04N 21/41407 725/82 |
| 2015/0358790 A1* | 12/2015 | Nasserbakht | G06F 17/30088 455/414.1 |
| 2016/0004871 A1* | 1/2016 | Guedalia | H04W 4/023 726/26 |
| 2016/0072855 A1* | 3/2016 | Palin | H04L 65/1069 709/219 |
| 2016/0088064 A1* | 3/2016 | Chen | H04M 1/7253 709/204 |
| 2016/0094648 A1* | 3/2016 | Han | H04W 76/02 709/209 |
| 2016/0156682 A1* | 6/2016 | Jeon | H04L 65/1069 709/204 |
| 2016/0157078 A1* | 6/2016 | Palin | H04W 8/005 455/41.2 |
| 2016/0198513 A1* | 7/2016 | Takano | H04W 76/14 370/329 |
| 2016/0241445 A1* | 8/2016 | Kim | H04L 67/10 |

FOREIGN PATENT DOCUMENTS

KR  10-1058451 B1  8/2011
KR  10-2013-0025675 A  3/2013

OTHER PUBLICATIONS

Idwan S, Fayyoumi E, Muhareb HA, Matar I, Rawashdeh OA. Achieving extended displays prototype via Wi-Fi direct technology. InHigh-capacity Optical Networks and Emerging/Enabling Technologies (HONET), 2014 11th Annual Dec. 15, 2014 (pp. 109-114). IEEE.*

Chong MK, Gellersen H. Usability classification for spontaneous device association. Personal and Ubiquitous Computing. Jan. 1, 2012;16(1)77-89. (Year: 2012).*

Idwan S, Fayyoumi E, Muhareb HA, Matar I, Rawashdeh OA. Achieving extended displays prototype via Wi-Fi direct technology. J InHigh-capacity Optical Networks and Emerging/Enabling Technologies (HONET), 2014 11th Annual Dec. 15, 2014 (pp. 109-114). IEEE. (Year: 2014).*

Davies N, Friday A, Newman P, Rutlidge S, Storz O. Using bluetooth device names to support interaction in smart environments. InProceedings of the 7th international conference on Mobile systems, applications, and services Jun. 22, 2009 (pp. 151-164). ACM. (Year: 2009).*

* cited by examiner

METHOD FOR SUPPORTING SITUATION SPECIFIC INFORMATION SHARING AND ELECTRONIC DEVICE SUPPORTING THE SAME

CLAIM OF PRIORITY

This application claims the benefit of priority under 35 U.S.C. § 119(a) from a Korean patent application filed on Jan. 6, 2015 in the Korean Intellectual Property Office and assigned Serial number 10-2015-0001458, the entire disclosure of which is hereby incorporated by reference.

BACKGROUND

1. Field of the Disclosure

The present disclosure relates to information sharing of an electronic device.

2. Description of the Related Art

In recent years, various electronic devices have become popular. For example, mobile smartphones are ubiquitous, and there has been an increase in wearable devices, and fixed-type TV devices are also growing in popularity.

However, conventional electronic devices often have information output functions that are separately performed, in order for a user to check information relating to a specific electronic device. It is inconvenient to check the specific electronic device. Additionally, in order for another electronic device to check information collected by the specific electronic device, it is inconvenient to set various settings associated with information sharing between electronic devices.

SUMMARY

Accordingly, an aspect of the present disclosure provides a method for supporting situation-specific information sharing in order to more conveniently check a user's information. The sharing of situation-specific information sharing is performed after a specified electronic device controls a state of another electronic device. An electronic device that performs the method is also disclosed herein.

Another aspect of the present disclosure is to provide a method for supporting situation-specific information sharing in order to more accurately and conveniently check a user's information. The sharing of information to be outputted by a specified electronic device according to each situation is disclosed, and an electronic device configured to perform the sharing is also disclosed.

In accordance with an aspect of the present disclosure, an electronic device (for example, a main electronic device) includes: a processor; a memory communicatively coupled to the processor, and the memory is configured to store collection information. The processor (or a control module including hardware circuitry such as a processor or microprocessor) is configured to perform a control operation that sets a state of an output device in order to output the collection information. The processor sets the state of the output device to output the collection information and controls transmission of the collection information to the output device.

In accordance with an aspect of the present disclosure, a situation-specific information sharing supporting method includes: checking a specified condition; if the specified condition is satisfied, setting an output state of a specified output device to permit outputting specified collection information; and transmitting the collection information to the specified output device.

DETAILED DESCRIPTION

Figure 1:
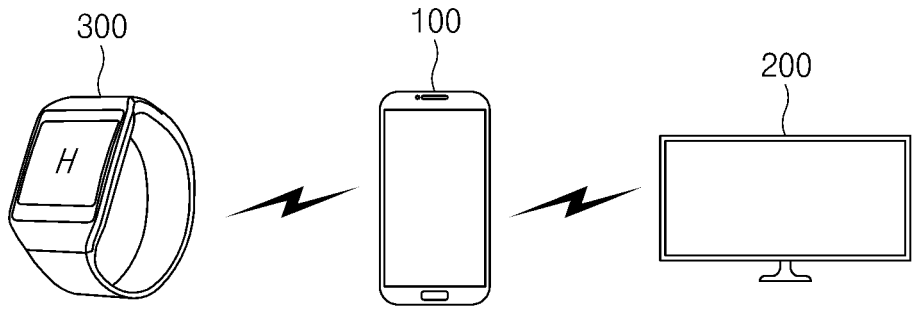
FIG. 1 is an illustration of a situation-specific information sharing supporting environment according to various embodiments of the present disclosure.

Hereinafter, various embodiments of the present disclosure are provided with reference to the accompanying drawings. However, a person of ordinary skill in the art should understand that the appended claims are not limited to the various embodiments disclosed herein. It should be further understood by the person of ordinary skill in the art that the present disclosure covers all the modifications, equivalents, and/or alternatives of this disclosure. With respect to the descriptions of the drawings, like reference numerals typically refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements of the appended claims to such embodiments. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and do not limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. Moreover, the terms defined in the dictionary should be considered to have the same meaning as the contextual meaning of the related art, and, unless clearly defined herein, should not be understood in way that contradicts the pages, or abnormally or as having an excessively formal meaning. In any cases, even the terms defined in this specification cannot be interpreted as excluding embodiments of the present disclosure.

Hereinafter, an electronic device according to various embodiments of the present disclosure will be described in more detail with reference to the accompanying drawings.

The term "user" in this disclosure may refer to a person using an electronic device or a device using an electronic device (for example, an artificial intelligent electronic device).

FIG. 1 is a view illustrating a situation-specific information sharing supporting environment according to various embodiments of the present disclosure.

Referring now to FIG. 1, the situation specific information sharing supporting environment 10 may include a main electronic device 100, an output device 200 (or a media device), and a sub-electronic device 300.

The situation-specific information sharing supporting environment 10 may support sharing collection information collected by the main electronic device 100 with the output device 200 in correspondence to a condition (or set condition information) set in the main electronic device 100. According to various embodiments of the present disclosure, the situation specific information sharing supporting environment 10 may support that main electronic device 100 checks a state of the output device 200 and the output device 200 becomes a state of outputting collection information according to a control of the main electronic device 100. Additionally or alternatively, the situation specific information sharing supporting environment 10 may include the sub-electronic device 300 for delivering collection information in communication with the main electronic device 100. For example, at least one sub-electronic device 300 communicable with the main electronic device 100 may transmit information obtained in correspondence to a set function performance to the main electronic device 100.

The main electronic device 100 may transmit collection information to a communication module of the output device 200 on standby at a time point that specified condition information is satisfied in order to establish a communication channel with the output device 200 or receive a message. If there is collection information to be transmitted, the main electronic device 100 may check a state of the output device 200. For example, the main electronic device 100 may transmit collection information in a state that the output device 200 accesses a specified network (for example, WiFi network). Alternatively, when that the output device 200 does not access a specified network, the main electronic device 100 may perform a discovery by using a short rage communication module and transmit collection information to the output device 200 connectible based on a discovery result. If a discovery is failed or it is impossible to connect to a found electronic device, the main electronic device 100 may perform a control to output collection information to its display.

The main electronic device 100 may collect information from another external electronic device (for example, the sub-electronic device 300 or a web server device) via at least one network. Additionally, the main electronic device 100 may collect various information according to its function performance.

According to various embodiments of the present disclosure, the main electronic device 100 may generate processing information processed in a specified form. The main electronic device 100 may store the processing information or transmit it to the output device 200. The main electronic device 100 may transmit at least one of collection information and processing information to the output device 200 in correspondence to a display state (for example, a turn-off state, a sleep state, a turn-on state, a specified program execution state, and so on) of the output device 200. According to various embodiments of the present disclosure, the main electronic device 100 may differently process a processing form of collection information in correspondence to a display state of the output device 200. Additionally, the main electronic device 100 may differently process a processing form in correspondence to at least one of the type, content, source of collection information. The main electronic device 100, for example, may be mobile electronic devices (for example, wearable electronic device, smartphones, note PCs, slate PCs, note pads, and so on). Alternatively, the main electronic device 100 may be an electronic device including network connection information according to a history of connected to a specified network regardless of a mobile or fixed type, and containing specified account information.

The output device 200 may establish a communication channel with the main electronic device 100 to receive collection information or processing information or may have a reception state for receiving information transmitted by the main electronic device 100. For example, the output device may establish a short range communication channel (for example, a Bluetooth communication channel) with the main electronic device 100 and may receive collection information or processing information from the main electronic device 100 through the short range communication channel. Alternatively, the output device 200 may receive collection information or processing information from the main electronic device 100 on the basis of a state of connected to a WiFi network. The output device 200 may be in a state of connected to a WiFi network but may have a state that a display module of the output device 200 is turned off. When collection information or processing information is received, the output device 200 may output received collection information after turned on in correspondence to a control of the main electronic device 100. Alternatively, the output device 200 may have a state of disconnected from a specified network and in this case, may establish a short range communication channel in correspondence to a short range communication connection request of the main electronic device 100. The output device 200 may receive a specified control signal (for example, a control signal for controlling a state so that collection information is outputted) through a short range communication channel. For example, when receiving a control signal for turning on a turned off display module, the output device 200 may turn-on the display module.

The output device 200 may output received collection information or processing information to a specified location. According to various embodiments of the present disclosure, the output device 200 may differently control an information output form according to its current state. For example, when the output device 200 in turn-off state is turned on in correspondence to a control of the main electronic device 100, it may output received collection information or processing information in full screen. Additionally, when the output device 200 is in turn-on state, it may output received collection information or processing information to a specified portion area of a display module.

According to various embodiments of the present disclosure, while outputting a screen according to a specified program or function execution, if collection information or processing information is received, the output device 200 may output at least one of the size, location, and form of the received collection information or processing information differently from another state (for example, differently from a turn-on state in a turn-off state). Additionally, the output device 200 may differently output at least one of the size, location, and form of collection information or processing information in correspondence to the type of a specified program or function execution screen. The output device 200 may stop the output of collection information or processing information or remove it in correspondence to a user input or the control information reception of the main electronic device 100.

The output device 200 may output audio information included in collection information (or processing information) in combination with displaying the screen of collection information (or processing information) according to a display state. The output device 200 may be fixed type electronic devices (for example, TV monitors, TV settop boxes, projectors, and various consumer electronic devices). Alternatively, the output device 200 may be mobile electronic devices. Alternatively, the output device 200 may be a large-screen electronic device. Alternatively, the output device 200 may be an audio dedicated electronic device. When the output device 200 is an audio dedicated electronic device, according to a specified condition information satisfaction, the output device 200 receives collection information or processing information in audio form from the main electronic device 100 and output it through an audio module. As mentioned above, the output device 200 may be a device such as a media apparatus or a media device for outputting content or information as at least one of audio and video.

The sub-electronic device 300 may establish a communication with the main electronic device 100 temporarily or periodically or maintain a communication channel continuously for a predetermined period. The sub-electronic device 300 may transmit information obtained in correspondence to a set function execution to the output device 200. For example, the sub-electronic device 300 may include at least one sensor and transmit sensor information obtained through a sensor operation to the main electronic device 100. According to various embodiments of the present disclosure, if the obtained sensor information satisfies specified condition information, the sub-electronic device 300 may transmit corresponding sensor information to the main electronic device 100. The condition information may be information set according to a user setting or received from the electronic device 100. The sub-electronic device 300, for example, may be various electronic devices such as a wearable electronic device or an alarm setting device.

Figure 2:
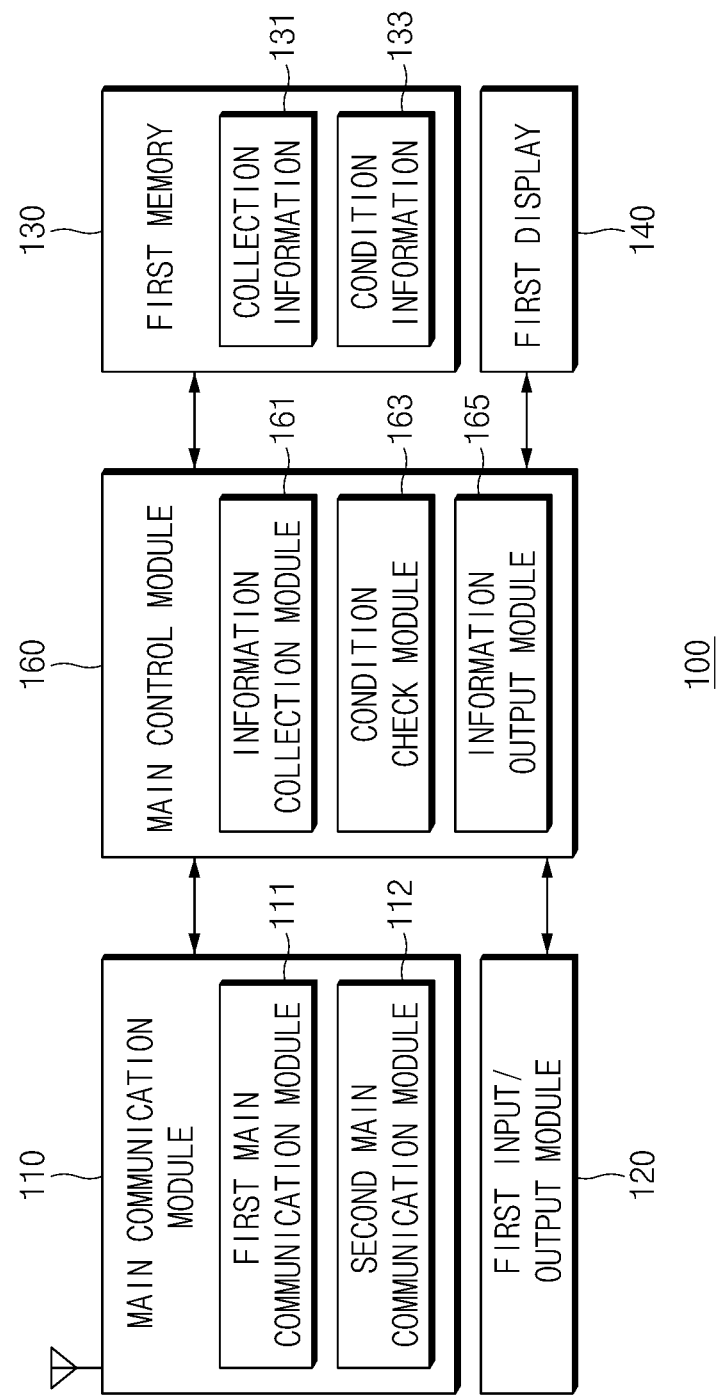
FIG. 2 is an illustration of a structure of a main electronic device according to various embodiments of the present disclosure.

FIG. 2 is a view illustrating a main electronic device according to various embodiments of the present disclosure.

Referring to FIG. 2, a main electronic device 100 may include a main communication module 110, a first input/output module 120, a first memory 130, a first display 140, and a main control module (or a main processor, or processor) 160.

The main communication module 110 may establish a communication channel with the output device 300. The main communication interface 110 may include a first main communication module 111 and a second main communication module 112. Additionally, the main communication module 110 may further include a network communication module (for example, a mobile communication module, and so on) accessible to a specified communication network. Additionally, the main communication module 110 may establish a communication channel with a specified network (for example, a WiFi network). According to an embodiment of the present disclosure, the main communication module 110 may have a state of connected to an access point of a WiFi network (or a state of establishing a communication channel).

The first main communication module 111 may establish a communication channel with the output device 200. The first main communication module 111, for example, may be a WiFi communication module, a Bluetooth communication module, and an NFC communication module. The first main communication module 111 may be activated when a condition according to condition information stored in the first memory 130 is satisfied. The first main communication module 111 may transmit collection information 131 or processing information obtained by processing the collection information 131 to the output device 200 in correspondence to a control of the main control module 160. The first main communication module 111 may transmit, to the output device 200, a control signal relating to a turn-on or turn-off control of the output device 200. According to various embodiments of the present disclosure, the first main communication module 111 may transmit, to the output device 200, a control signal for controlling a state of the output device 200 (for example, a control signal for requesting switching to a state of outputting collection information or a control signal for requesting to turn-on a display module) in correspondence to a control of the main control module 160.

The second main communication module 112 may be a short range communication module having a different type from the first main communication module 111. For example, the second main communication module 112 may be a Bluetooth communication module, a WiFi communication module, and an NFC communication module. The second main communication module 112 may establish a communication channel between the sub-electronic device 300 and the main electronic device 100. The second main communication module 112 may receive specified collection information from the sub-electronic device 300 and deliver it to the first memory 130. Alternatively, the second main communication module 112 may receive collection information requested according to a user input, from the sub-electronic device 300.

The second main communication module 112 may be activated at a specified scheduling time or according to a user input. Alternatively, the second main communication module 112 may wait for receiving a communication channel establishment request from the sub-electronic device 300 by activating a BLE communication module and establish a Bluetooth communication channel according to a request of the sub-electronic device 300 (or when the communication channel establishment request is received). According to various embodiments of the present disclosure, the second main communication module 112 may include a mobile communication module and establish a communication channel with a web server device. The second main communication module 112 may receive specified information as collection information from a web server device and deliver it to the first memory 130. According to various embodiments of the present disclosure, the first main communication module 111 and the second main communication module 112 may be configured with the same communication module. In this case, the main communication module 110 may be prepared in a form of including one communication module.

According to various embodiments of the present disclosure, the second main communication module 112 may discover at least one output device 200 specified in correspondence to a control of the main control module 160. The second main communication module 112 may attempt to connect to the found output device 200 automatically or according to a user input. The second main communication module 112 may transmit, to the output device 200, a control signal for controlling a state of the output device 200 (for example, a control signal for requesting switching to a state of outputting collection information or a control signal for requesting to turn-on a display module) in correspondence to a control of the main control module 160.

The first input/output module 120 may support an input function for processing a user input of the main electronic device 100. According to an embodiment of the present disclosure, the first input/output module 120 includes various input means such as a physical button, a key pad, a touch pad, and so on and may generate an input signal according to a user input. The first input/output module 120 may generate an input signal for controlling the turn-on or turn-off of an electronic device, an input signal relating to a short range communication channel establishment with the output device 200, and an input signal relating to a communication channel establishment with the sub-electronic device 300 in correspondence to a user input. The first input/output module 120 may generate an input signal for selecting the type of the collection information to be transmitted to the output device 200 and an input signal for setting the condition information 133 of the collection information 131 in correspondence to a user input. The generated input signals may be delivered to the main control module 160 and used as at least one instruction relating to a corresponding function execution.

According to various embodiments of the present disclosure, the first input/output module 120 may include a microphone for collecting surrounding audio signals and a speaker for outputting an audio generated according to a function operation. Additionally, the first input/output module 120 may include at least one of a lamp for outputting a specified color of light in correspondence to a specified pattern and a vibration module for providing vibration in a specified pattern according to function performance. In relation to audio function processing, the first input/output module 120 may output at least one of a guide sound relating to the acquisition of the collection information 131, a guide sound relating to the satisfaction of the condition information 133, and a guide sound relating to the transmission of the collection information 131 according to a setting. Additionally, the first input/output module 120 may output a guide sound for guiding the generation of processing information on the basis of collection information. When the guide sound output is set to be omitted or a corresponding function is not supported, the first input/output module 120 may omit the guide sound output.

The first memory 130 may store various programs and data relating to an operation of the main electronic device 100. For example, the first memory 130 may store operating system, middleware, Application Protocol Interface (API), and application for operations of the main electronic device 100. According to an embodiment of the present disclosure, the first memory 130 may include a situation specific information sharing program. The situation specific information sharing program, for example, may include a routine (for example, at least one instruction function, class, template, and structure) set to obtain at least one information (for example, information according to a function performance of the sub-electronic device 300, information according to a function performance of the main electronic device 100, or information provided by a web server device). The situation specific information sharing program may include a routine for supporting a setting of the condition information 133 for at least one collection information, a processing routine of the collection information 131 according to whether the set condition information 133 is satisfied, and a routine set to transmit at least one of the collection information 131 and processing information to the output device 200.

The first memory 130, for example, may store the collection information 131 and the condition information 133. The collection information 131, as described above, may include at least one of information received from the sub-electronic device 300, information according to a function performance of the main electronic device 100, and information obtained from a web server device. The collection information 131 may be stored temporarily or accumulatively. The collection information 131 may be processed according to a display state of the output device 200 and converted into processing information. Accordingly, the first memory 130 may store processing information. The processing information may include information in which at least one of the resolution, size, and form of the collection information 131 and a location to be outputted to the display module of the output device 200 is adjusted.

The condition information 133 may include a condition for transmitting at least one of the collection information 131 to the output device 200. For example, the condition information 133 may include alarm information for setting a specified time. The condition information 133 may include location information for setting a specified location. The condition information 133 may include information on whether a specified type of information is collected. The condition information 133 may include information on whether a specified amount of specified type information is collected within a specified time. The condition information 133 may include a condition that a specified type of information is not collected at a specified time point and a condition for checking whether the size of specified information is not collected. The condition information 133 may be set differently according to the type of the collection information 131. Alternatively, a plurality of condition information 133 may be set in the same collection information 131 in correspondence to a user setting.

According to various embodiments of the present disclosure, the condition information 133 may include a condition for checking whether the collection information 131 is processed as processing information. For example, the condition information 133 may include a processing condition set to differently process the collection information 131 according to an output time. According to an embodiment of the present disclosure, the condition information 133 may include a condition set to process first collection information as first processing information when the first collection information is collected at a first time point. Additionally, the condition information 133 may include a condition set to process first collection information as second processing information when the first collection information is collected at a second time point. Herein, the first processing information and the second processing information may have a different processing degree or level, amount, grade, and so on including the size, output location, output means (for example, a display module or an audio module of an output device), and output form of information to be outputted. Additionally, the condition information 133 may include processing condition information for a different processing degree of collection information according to a display state of the output device 200.

The first display 140 may output at least one user interface according to a function operation of the main electronic device 100. For example, the first display 140 may output at least one of the standby screen, home screen, menu screen, and icon arrangement screen of the main electronic device 100. Additionally, the first display 140 may output a screen according to a communication connection with the output device 200. For example, the first display 140 may output at least one of information collected according to a setting and collected information specified by the condition information 133. The first display 140 may output a screen for notifying a communication channel establishment with the sub-electronic device 300 and information reception from the sub-electronic device 300. The first display 140 may output a screen for notifying the acquisition of the collection information 131 that satisfies the condition information 133 or an acquisition guide object (for example, at least one text or image configuring a screen). The first display 140 may output a screen for guiding the transmission of the output device 200 of the collection information 131 that satisfies the condition information 133. The first display 140 may output a screen relating to the generation of processing information relating to the collection information 131 or relating to the transmission of processing information.

According to various embodiments of the present disclosure, the first display 140 may output information relating to whether the output device 200 is connected to a specified network and information relating to whether the output device 200 connected to a specified network is in a turn-off state or a turn-on state. Additionally, the first display 140 may output a discovery result (for example, guide information for guiding that there is no found output device or identification information of a found output device) for a surrounding output device by using the second main communication module 112. The first display 140 may output connection state information with a found output device, identification information of a short range connected output device, and state information (for example, a turn-on or turn-off state, or collection information output availability (or unavailability)) of a short range communication connected output device. As mentioned above, the first display 140 may output information indicating whether collection information is transmitted to the output device 200 through a specified network or information indicating whether collection information is transmitted based on a discovery and a connection relating to a short range communication channel. According to various embodiments of the present disclosure, if collection information transmission is unavailable, the first display 140 may output collection information. Alternatively, the first display 140 may output collection information transmitted to the output device 200.

The main control module 160 may process and deliver signals necessary for operations of the main electronic device 100 or generate control signals. In relation to this, the main control module 160 may include an information collection module 161, a condition check module 163, and an information output module 165.

The information collection module 161 may collect information specified according to a setting (for example, the condition information 133). For example, the information collection module 161 may collect collection information 131 corresponding to whether a specific time set in the main electronic device 100 arrives or whether the main electronic device 100 is placed at a specified location. Alternatively, the information collection module 161 may receive the collection information 131 from the sub-electronic device 300 according to at least one of a specific time and a specified location. Additionally, the information collection module 161 may receive and store information set to be transmitted from the sub-electronic device 300 or an external server device.

According to various embodiments of the present disclosure, the information collection module 161 may check the type of information written in the condition information 133 and collect corresponding information. For example, when an alarm is set in the condition information 133, the information collection module 161 may collect time information in real time or periodically. When a location specified condition is set in the condition information 133, the information collection module 161 may collect the current location information in real time or periodically.

According to various embodiments of the present disclosure, when a specific information condition relating to a specified program is set in the condition information 133, the information collection module 161 may monitor a specified program activation and collect information according to a corresponding program activation process. Additionally, in a case that a specified electronic device is set in the condition information 133 (or a program type of a specified electronic device is set), the information collection module 161 may receive specified information (or information according to a program execution of a specified electronic device) from a corresponding electronic device in real time, periodically, or when a communication channel is established with a corresponding electronic device. The information collection module 161 may perform a control to store received information as the collection information 131 of the first memory 130.

The condition check module 163 may check whether the condition information 133 relating to the collection information 131 stored in the first memory 130 is satisfied. When the collection information 131 satisfies the specified condition information 133, the condition check module 163 may output an alarm for corresponding condition satisfaction or deliver the corresponding collection information 131 to the information output module 165.

According to various embodiments of the present disclosure, the condition check module 163 may control a screen output relating to a setting of the condition information 133. In relation to this, the condition check module 163 may perform a control to output an icon or a menu item for setting to the first display 140. When a setting icon or a menu item is selected, the condition check module 163 may perform a control to output a setting screen of the condition information 133 to the first display 140. The condition check module 163 may collect various conditions according to a user input and update the condition information 133 stored in the first memory 130. For example, the condition check module 163 may perform a control to output, to the first display 140, various embodiments relating to alarm condition change information, location condition change information, program type condition information, external electronic device type condition information, and program type condition information of an external electronic device. When a user input occurs after a specific item selection, the condition check module 163 may process the update of the condition information 133 in correspondence to a corresponding input.

The information output module 165 may receive the condition-satisfied collection information 131 from the condition check module 163. The information output module 165 may generate processing information obtained by processing the received collection information 131 according to a specified setting (or rule). For example, the information output module 165 may generate processing information that differently defines at least one of a location for outputting the collection information 131, the size of information, and the form of information in correspondence to at least one of a collection time point, a collection location, and a subject for providing information (for example, a program, an electronic device, and so on).

According to various embodiments of the present disclosure, the information output module 165 may determine whether to transmit the collection information 131 or the processing information and process it in correspondence to a display state of the output device 200. For example, when the display state of the output device 200 is in a turn-off state, the information output module 165 may perform a control to transmit the condition satisfying collection information 131 to the output device 200. When the display state of the output device 200 is in a specified program execution state, the information output module 165 may perform a control to transmit processing information obtained by processing the collection information 131 to the output device 200. Alternatively, the information output module 165 may check a display state of the output device 200 and may differently vary a processing degree of the collection information 131 according to a corresponding display state. According to an embodiment of the present disclosure, the information output module 165 may differently process at least one of the size, location, form, and means of processing information to be outputted in correspondence to the turn-off state, turn-on state, and specified program execution state of the output device 200.

According to various embodiments of the present disclosure, when it comes to a time point for transmitting collection information to the output device 200, the information output module 165 may check a state of the output device 200 according to a specified condition satisfaction. For example, the information output module 165 may check whether the output device 200 is connected to a specified network (for example, WiFi network or the same Local Area Network (LAN)). When the output device 200 is connected to a specified network and is in a sleep state (or when a display module is in a turn-off state), the information output module 165 may transmit a control signal for waking up the output device 200 to the output device 200 through a specified network. During this operation, the information output module 165 may operate information such as AP SSID, AP MAC address, MAC addresses of a main electronic device and an output device, and IP. The address information may be collected from a specified network or a pre communication channel establishment operation with an output device.

According to various embodiments of the present disclosure, the information output module 165 may establish a short range communication channel with the output device 200 not connected to a specified network. During this operation, the information output module 165 may deliver a wake up control signal (for example, Wake On BLE instruction) to the turned off beaconing output device 200 to turn-on the output device 200 (or a state for outputting collection information). When the output device 200 is in a turn-on state, the information output module 165 may transmit at least one of the collection information and the processing information to the output device 200.

As mentioned above, according to various embodiments of the present disclosure, an electronic device (for example, a main electronic device) may include a memory for storing collection information and a control module for transmitting at least one of the collection information and processing information processed based on the collection information when the collection information stored in the memory corresponds to specified condition information.

According to various embodiments of the present disclosure, the control module may receive biometric information including at least one of heart rate sensor information, temperature information, humidity information, luminance information, body temperature information, blood flow related information, and oxygen saturation information, which are collected by a sensor module included in a sub-electronic device, as the collected information to store it in the memory.

According to various embodiments of the present disclosure, the control module may perform a control to transmit biometric information of greater than a specified size to the output device.

According to various embodiments of the present disclosure, when connecting to a sub-electronic device in exercise function execution, the control module may receive exercise related information including exercise plan information, exercise measurement amount information, and exercise result analysis information from the sub-electronic device to store it as the collection information in the memory or transmit it to the output device.

According to various embodiments of the present disclosure, the control module may perform a control to transmit corresponding information to the output device when weather information is collected, when traffic information is collected, or when a set alarm time arrives.

According to various embodiments of the present disclosure, the control module may transmit the collection information as it is (for example, a state of maintaining a resolution or at least one of the size and location outputted from a main electronic device) or transmit the collection information as processing information processed in a specified form according to a display state of the output device.

According to various embodiments of the present disclosure, when the output device is in a turn-off state, after turning on the output device, the control module transmits the collection information to output it in full screen of the output device.

According to various embodiments of the present disclosure, when the output device is in a turn-on state, the control module converts the collection information into a specified predetermined size of processing information to transmit and output it to the output device.

According to various embodiments of the present disclosure, when the output device is in a turn-on state and outputs a specified program execution screen, the control module may transmit and output a predetermined size of guide information for guiding information output to the output device.

According to various embodiments of the present disclosure, the control module may perform a control to transmit the processing information obtained by processing the collection information in a specified form to the output device according to at least one of the type of the collection information, a collection time point of collection information, a collection location of collection information, program type information relating to collection information, external electronic device type information relating to collection information, and program type information of an external electronic device relating to collection information.

As mentioned above, according to various embodiments of the present disclosure, an electronic device (for example, a main electronic device) may include a memory for storing collection information and a control module for transmitting the collection information to the output device after performing a control to allow an output device that is to output the collection information to be in a state for outputting the collection information.

According to various embodiments of the present disclosure, the control module may perform a control to check condition information relating to the collection information and if the collection information satisfies the condition information, transmit the collection information to the output device.

According to various embodiments of the present disclosure, when the output device is connected to a specified network, the control module may perform a control to allow the output device to be in a state for outputting the collection information through the specified network.

According to various embodiments of the present disclosure, the control module may perform the output device discovery and if a specified output device is found, attempt a connection with the found output device.

According to various embodiments of the present disclosure, the control module may perform a control to display the collection information when the output device discovery is failed.

According to various embodiments of the present disclosure, if the output device discovery is failed, the control module may perform a control to output guide information according to the discovery failure.

According to various embodiments of the present disclosure, when the found output device is connectible, the control module may perform a control to allow the connected output device to be in a state for outputting the collection information.

According to various embodiments of the present disclosure, the control module may perform a control to display the collection information when the output device connection is failed.

According to various embodiments of the present disclosure, the control module may perform a control to transmit, to the output device, a message for requesting an output stop of the collection information in correspondence to a user input.

According to various embodiments of the present disclosure, the control module may perform a control to transmit, to the output device, the collection information including at least one of schedule information, weather information, and traffic information.

Figure 3:
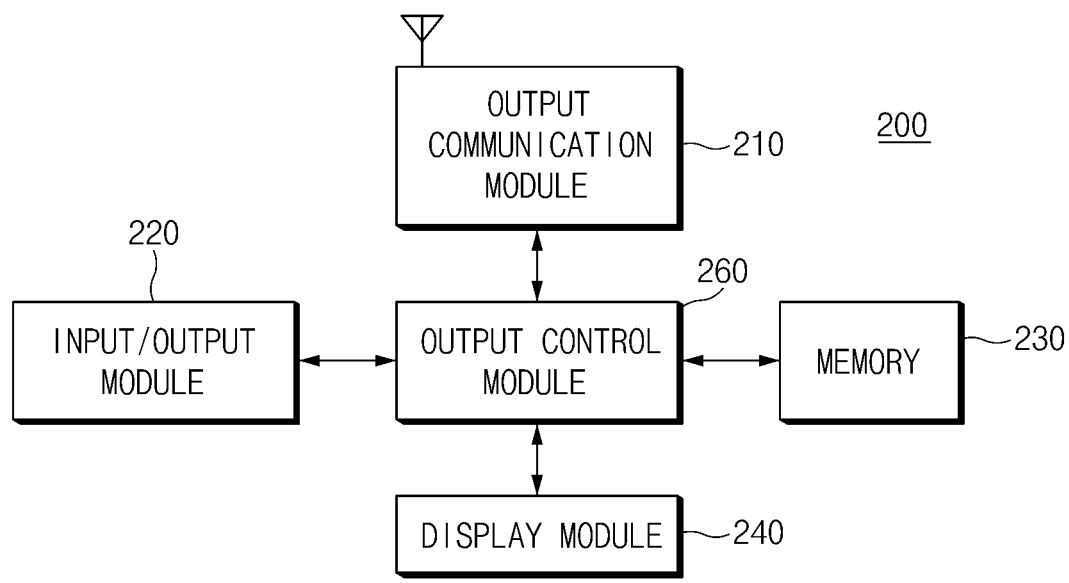
FIG. 3 is a schematic of an output device according to various embodiments of the present disclosure.

FIG. 3 is a view illustrating an output device according to various embodiments of the present disclosure.

Referring to FIG. 3, an output device 200 according to various embodiments of the present disclosure may include an output communication module 210, a memory 230, a display module 240, and an output control module 260.

The output communication module 210 may support a communication channel establishment of the output device 200. The output communication module 210, for example, may establish a communication channel with the first main communication module 111 of the main electronic device 100 via a specified network. The output communication module 210 may receive at least one of the collection information and processing information from the main electronic device 100. The output communication module 210 may deliver at least one of the received collection information 131 and processing information to the output control module 260. According to various embodiments of the present disclosure, the output communication module 210 may receive a control signal (for example, a signal for requesting switching to a turn-on state) relating to a state control transmitted by the main electronic device 100. According to various embodiments of the present disclosure, the output communication module 210 may be excluded from the output device 200 or may have a turn-off state.

According to various embodiments of the present disclosure, the output communication module 210 may establish a communication channel with the second main communication module 112 of the main electronic device 100. In relation to this, the output communication module 210 may have a state of transmitting a beaconing signal. Alternatively, the output communication module 210 may have a state of receiving a beaconing signal. The output communication module 210 may establish a short range communication channel according to a request of the main electronic device 100 and receive a state control signal (for example, a signal for requesting a state of outputting collection information or a signal for requesting the turn-on of the display module 240) through the short range communication channel. According to various embodiments of the present disclosure, the output communication module 210 may transmit its state information (for example, a turn-on or turn-off state or a sleep state) to the main electronic device 100 having an established short range communication channel.

As mentioned above, the output communication module 210 may include a plurality of modules such as a communication module establishing a communication channel with a specified network and a communication module communicating with the second main communication module 112 of the main electronic device 100.

Although it is described above that the main electronic device 100 processes the collection information 131 to correspond to a display state of the output device 200, various embodiments are not limited thereto. For example, the collection information 131 may be processed by the output device 200. In this case, the output communication module 210 may receive the collection information 131 from the main electronic device 100 and deliver it to the output control module 260 in relation to the processing of the collection information 131.

Additionally, the output device 200 may further include the input/output module 220. The input/output module 220 may process a user input of the output device 200 or output information. According to an embodiment of the present disclosure, the input/output module 220 may include at least one physical button. The physical button, for example, may include a button for turning on the output device 200, a button for turning off the output device 200, and a button for selecting a specified program and executing a program.

According to various embodiments of the present disclosure, the input/output module 220 may include a speaker for outputting audio signals. The input/output module 220 may output audio information according to a specified program execution. According to various embodiments of the present disclosure, when audio information is included in the collection information 131 received from the main electronic device 200, the input/output 220 may output corresponding audio information. When the collection information 131 (or the processing information) including audio information is received during program execution, the input/output module 220 may limit an audio output according to the program execution temporarily and output audio information included in the collection information 131.

According to various embodiments of the present disclosure, the input/output module 220 may differently output audio information according to a state of the display module 240. For example, when collection information is received in a state that the display module 240 is in a turn-off state or a turn-on state, the input/output module 220 may perform a control to output audio information included in collection information in correspondence to a control of the output control module 260. Additionally, when collection information is received in a state that a specified program execution screen is outputted to the display module 240, the input/output module 220 may omit the output of audio information included in the collection information in correspondence to a control of the output control module 260.

According to various embodiments of the present disclosure, the input/output module 220 may differently output audio information included in collection information (or processing information) according to at least one of the type of a specified program and the type of collection information (or the type of processing information). For example, in a state that an execution screen of a program having a relatively high preference is outputted, if collection information (or processing information) included in audio information is received, during collection information output, the input/output module 220 may output audio information according to a program execution without outputting audio information included in collection information. When a program having a relatively low preference is executed, the input/output module 220 may not output audio information according to a program execution and output audio information included in collection information. The preference may be specified or vary according to a program execution history, a user setting, or a setting at the time of designing a program. The input/output module 220 may support a simultaneous output of program related audio information and collection information related audio information according to a setting. Alternatively, the input/output module 220 may perform output switching of program related audio information or collection information related audio information in correspondence to a user input.

The memory 230, which is a non-transitory memory, may store at least one program or data necessary for an operation of the output device 200. For example, the memory 230 may include at least one program information executed in the output device 200. According to an embodiment of the present disclosure, when the output device 200 is a TV, the memory 230 may include program guide information. Additionally, the memory 230 may store the collection information 131 (or processing information) received from the main electronic device 100 temporarily or semi-permanently. Additionally, the memory 230 may store log information (for example, information on a time of receiving the collection information 131, the type of the collection information 131, output time information of the collection information 131, and so on) of the collection information 131 received from the main electronic device 100. When receiving a plurality of collection information 131, the memory 230 may store received collection information in a list form and support to output it to the display module 240 according to a user input. Accordingly, a user may check what form the collection information 131 is outputted at a certain time point through the output device 200.

The display module 240, for example, comprises hardware may output at least one screen relating to the output device 200. The display module 240 may have various display states in correspondence to a user control or a control by the main electronic device 100. For example, the display module 240 may have a turn-off state, a turn-on state, and a specified program execution state. The display module 240 may output the collection information 131 received from the main electronic device 100. Alternatively, the display module 240 may output processing information processed based on the collection information 131. Alternatively, the display module 240 may output a program execution screen and the collection information 131 or processing information simultaneously. Alternatively, the display module 240 may output information for guiding the reception of the collection information 131 (or processing information) or a specified display effect. The collection information 131 or processing information outputted to the display module 240 may be limited in output or removed in correspondence to a user control (for example, a control of the main electronic device 100 or a control according to an operation of the input/output module 220 of the output device 200). According to various embodiments of the present disclosure, the output device 200 may be various media devices such as a settop box not including the display module 240 or an audio device including only audio information.

The output control module 260 comprises hardware that can deliver and process signals used for operations of the output device 200, or may also generate control signals. For example, the output control module 260 may perform a control to turn-on the display module 240 in correspondence to a control signal (for example, a user input, set schedule information, or control information of the main electronic device 100). The output control module 260 may execute specified programs in response to a control signal and perform a control to output a screen according to program execution to the display module 240. According to an embodiment of the present disclosure, when the output device 200 is a broadcast reception device, the output control module 260 may receive a broadcast signal of a channel according to a control signal and output it. According to various embodiments of the present disclosure, when the output device 200 is a display device or a large-screen storage device, the output control module 260 may perform a control to output a screen according to stored content playback to the display module 240. Alternatively, the output control module 260 may perform a control to receive streaming data or download data provided by a web server device and output it to the display module 240.

When receiving the collection information 131 from the main electronic device 100, the output control module 260 may perform a control to output the received collection information 131 to a predetermined position of the display module 240. Alternatively, when receiving processing information processed based on the collection information 131 from the main electronic device 100, the output control module 260 may perform a control to output corresponding processing information in a predetermined size and at a specified position. In the above-mentioned operations, the output control module 260 may perform a control to check a position, a size, a form, and a way (for example, at least one of a display module and an audio module) for outputting corresponding information by checking the header information of the collection information 131 or processing information, and when the corresponding information is set to be outputted to the display module 240, output the collection information 131 or the processing information to the display module 240.

According to various embodiments of the present disclosure, the output device 200 may be designed to process the collection information 131. In this case, when receiving the collection information 131 from the main electronic device 100, the output control module 260 may generate processing information by processing the collection information 131 to correspond to a display state of the display module 240. Alternatively, the output control module 260 may perform a control to differently output at least one of the size, position, form, and means of the collection information 131 according to the type (for example, a type according to an emergency level) of the collection information 131. According to an embodiment of the present disclosure, if the collection information 131 is heart rate information (for example, information of which rating set according to a policy or a design method is relatively high, wherein the rating is determined by an electronic device designer's setting or is changeable according to a user setting) received from the sub-electronic device 300 worn by a specified user, the output control module 260 may perform a control to output the collection information 131 in full screen of the display module 240. Additionally or alternatively, in the case of the collection information 131 having a relatively high rating, the output control module 260 may perform a control to provide a specified display effect (for example, output a flash for a predetermined time).

According to various embodiments of the present disclosure, if the received collection information 131 includes screen information and audio information, the output control module 260 may perform a control to display the screen information to the display module 240 and output the audio information through the input/output module 220. Herein, the output device 260 may vary an audio output form according to the type of the collection information 131. For example, if the collection information 131 is tomorrow weather information (for example, information having a relatively low rating), the output control module 260 does not output audio information and perform a control to display the collection information 131 (or processing information processed in correspondence thereto) with a specified predetermined size (for example, a smaller size than the total size of the display module 240) in an edge area of the display module 240. If the rating of the collection information 131 is relatively high (or greater than a specified rating), the output control module 260 may perform a control to output audio information relating to the collection information 131. According to various embodiments of the present disclosure, when outputting audio information relating to the collection information 131, the output control module 260 may perform a control to differently output the size of a volume according to the state of the display module 240 or the rating of the collection information 131.

According to various embodiments of the present disclosure, the output control module 260 may perform a control to output processing information received from the main electronic device 100 at a predetermined position of the display module 240 according to a setting value (for example, at least one of the position, size, and form of the processing information to be outputted) set in the processing information. Additionally, the output control module 260 may perform a control to output specified audio information according to the type of the processing information. Additionally, if processing information includes audio information, the output control module 260 may perform a control to output corresponding audio information with a specified volume size (or a volume size set according to the type of processing information).

According to various embodiments of the present disclosure, when a state control signal transmitted by the main electronic device 100 is received, the output control module 260 may perform a state control according to the state control signal through a specified network (for example, WiFi network, and so on). For example, when the display module 240 is in a turn-off state, the output control module 260 may perform a control to be in a turn-on state. In relation to this, the output control module 260 may maintain and manage a connection state with a specified network. According to various embodiments of the present disclosure, if a connection with a specified network is cut off or a related communication module is turned off, the output control module 260 may perform a control to be in a state for establishing a short range communication channel with the main electronic device 100. In relation to this, the output control module 260 may perform a control to output a beaconing signal through a short range communication module or may perform a control on a communication module to receive a signal for requesting a short range communication channel establishment of the main electronic device 100.

According to various embodiments of the present disclosure, when a short range communication channel is established, the output control module 260 may perform a control to transmit state information to the main electronic device 100 according to a setting or wait for receiving a state control signal from the main electronic device 100. When a state control signal is received, the output control module 260 may perform a control to be in a state (for example, turn-on the display module 240) according to a corresponding control signal. The output control module 260 may perform a control to output collection information (or processing information) transmitted by the main electronic device 100.

As mentioned above, according to various embodiments of the present disclosure, an output device may include a communication module (for example, an output communication module) for receiving collection information that an external electronic device (for example, a main electronic device) transmits according to a specified condition satisfaction and an output control module for identifying and outputting the received collection information in correspondence to a display state of a display module.

According to various embodiments of the present disclosure, the output control module may perform a control to vary a processing form of received collection information according to one of the turn-on state and turn-off state of the display module and a specified program execution screen output state.

According to various embodiments of the present disclosure, when the collection information is received in the turn-off state, the output control module may turn-on the display module and may perform a control to output the collection information in full screen of the display module.

According to various embodiments of the present disclosure, when the collection information is received in the turn-on state, the output control module may perform a control to convert the collection information into a predetermined size of processing information and output the converted information to a predetermined area of the display module.

According to various embodiments of the present disclosure, when the collection information is received in the specified program execution screen output state, the output control module may perform a control to output guide information for guiding the collection information reception.

According to various embodiments of the present disclosure, when selecting the guide information, the output control module may perform a control to output the collection information in full screen or output a predetermined size of processing information generated based on the collection information.

According to various embodiments of the present disclosure, the output control module may perform a control to differently output at least one of the size, position, and form to be outputted to the display module according to the type or content of the collection information.

According to various embodiments of the present disclosure, the output control module may perform a control to classify and display connection information according to the type of an electronic device providing the collection information.

According to various embodiments of the present disclosure, the output control module may perform a control to stop the output of the collection information when a specified time elapses or may perform a control to stop the output of the collection information according to a control signal from an electronic device that transmits the collection information.

Additionally, according to various embodiments of the present disclosure, an output device may include a communication module (for example, an output communication module) for receiving collection information that an external electronic device (for example, a main electronic device) transmits according to a specified condition satisfaction and an output control module for differently outputting the output form of the collection information in correspondence to at least one of the type of the received collection information and a display state of a display module.

According to various embodiments of the present disclosure, an output control module may vary at least one of the output position, size, and form of collection information according to a rating of the collection information (or at least one of content, source, transmission time point, the location of the external electronic device or a device providing the collection information, and the type of the collection information related program).

According to various embodiments of the present disclosure, the output control module may control the output of processing information in another form (for example, at least one different form among position, size, and form to be outputted to a display module) by performing a control to vary the processing form of collection information according to at least one of the rating, content, source, transmission time point, and collection location of the collection information, the type of a collection related device, and a program type.

According to various embodiments of the present disclosure, the output control module may perform a control to differently output at least one of whether to output audio information included in the collection information and the volume size of audio information according to at least one of the rating, content, source, transmission time point, and collection location of the collection information, the type of a collection related device, and a program type.

Additionally, according to various embodiments of the present disclosure, an output device may include a communication module (for example, an output communication module) for transmitting display state related information to an external electronic device (for example, a main electronic device) and receiving processing information that the external electronic device processes differently according to the display state and an output control module for performing a control to output the received processing information.

The output control module may perform a control to output the processing information according to the output, size, output position, and output form of the processing information by checking the header information of the processing information.

The output control module may perform a control to differently output at least one of whether to output audio information included in the processing information and the volume size of audio information according to at least one of the rating, content, source, transmission time point, and collection location of the collection information, the type of a collection related device, and a program type.

Figure 4:
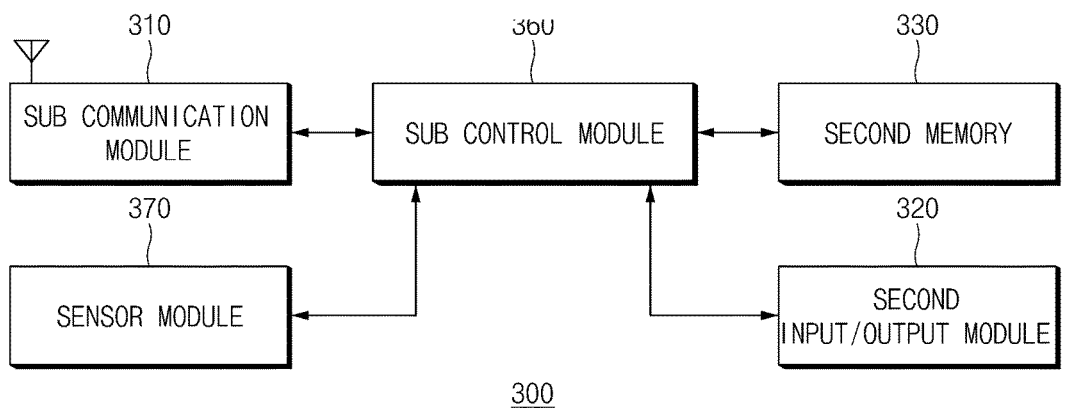
FIG. 4 is a, illustration of a sub-electronic device according to various embodiments of the present disclosure.

FIG. 4 is a view illustrating a sub-electronic device according to various embodiments of the present disclosure.

Referring to FIG. 4, a sub-electronic device 300 may include a sub communication module 310, a second input/output module 320, a second memory 330, a sensor module 370, and a sub control module 360.

The sub communication module 310 may support a communication function of the sub-electronic device 300. For example, the sub communication module 310 may establish a communication channel with the second main communication module 112 of the main electronic device 100. According to an embodiment of the present disclosure, the sub communication module 310 may be a short range wireless communication module (for example, a Bluetooth communication module, a BLE communication module, a WiFi direct communication module, and so on). The sub communication module 310 may transmit collection information that the sub-electronic device 300 collects to the main electronic device 100 in real time, in a predetermined period, or at a specified time point. According to various embodiments of the present disclosure, the sub communication module 310 may be activated when information satisfying a specified condition occurs among collected information. The sub communication module 310 may receive a message for requesting a specified type of information transmission from the main electronic device 100. Alternatively, the sub communication module 310 may receive condition information from the main electronic device 100.

The second input/output module 320 may support a user input function relating to a control of the sub-electronic device 300. For example, the second input/output module 320 may include at least physical button or a display of an input function. The second input/output module 320 may generate an input signal for controlling the turn-on or turn-off of the sub-electronic device 300 or an input signal for requesting a specific function execution (for example, a heart rate sensor function, a health function, and so on) of the sub-electronic device 300 in correspondence to a user input. Additionally, the second input/output module 320 may generate a function activation input signal for transmitting collected information to the main electronic device 100 and an input signal for deactivating an information transmission function in correspondence to a user input. The input signal may be delivered to the sub control module 360 and used as at least one instruction for corresponding function execution.

The second input/output module 320 may have an audio module including at least one of a microphone and a speaker. The audio module may output audio information relating to a communication channel establishment with the main electronic device 100 and audio information relating to the transmission of collected information. The output of the audio information may be omitted according to a setting.

The second memory 330, which comprises a non-transitory memory, may store data according to a program relating to an operation of the sub-electronic device 300 or a function operation. According to various embodiments of the present disclosure, the second memory 330 may store a health care function related program (for example, a heart rate function operation related program, a heart rate sensor information analysis related program, and an exercise function performance related program) and a sleeping care function related program. The second memory 330 may store sensor information collected by the sensor module 370 temporarily or semi-permanently. Sensor information satisfying a specified condition among stored sensor information may be transmitted as collection information to the main electronic device 100.

The sensor module 370 may include at least one sensor. For example, the sensor module 370 may include an acceleration sensor, a gyro sensor, an altitude sensor, and location information collection sensor. Additionally, the sensor module 370 may include a biometric information detection sensor (for example, a heart rate detection sensor, an oxygen saturation detection sensor, a blood alcohol or nicotine concentration detection sensor, a body temperature sensor, and so on), a temperature detection sensor, a humidity detection sensor, and an illumination detection sensor. The sensor module 370 may be activated according to a control of the sub control module 360, activated at a specified time (for example, a specified sleeping time slot), activated at a specified location, or may be activated in linkage when a specified program is activated. The sensor information collected by the sensor module 370 may be delivered to the sub control module 360.

The sub control module 360 may perform a control to process, store, or transmit signals necessary for operations of the sub-electronic device 300. According to an embodiment of the present disclosure, the sub control module 360 may activate the sensor module 370 according to a setting or the type of a program in execution and may perform a control to transmit collected sensor information to the main electronic device 100. Alternatively, when the collected sensor information exceeds a specified reference value, the sub control module 360 may perform a control to transmit the collected sensing information to the main electronic device 300. For example, when a heart rate is greater than a specified value, the sub control module 360 may perform a control to transmit the heart rate sensing information to the main electronic device 300. When body temperature information (or temperature information, humidity information, illumination information, and so on) is greater than a specified value, the sub control module 360 may perform a control to transmit body temperature sensing information (or temperature sensing information, humidity sensing information, illumination sensing information, and so on) to the main electronic device 100. When oxygen saturation information is greater than a specified value, the sub control module 360 (e.g., sub processor or processor) may perform a control to transmit the oxygen saturation information to the main electronic device 100. Additionally, when various biometric information such as blood alcohol concentration information, blood nicotine concentration information, blood flow amount information, and blood flow velocity information, the sub control module 360 may transmit the various biometric information to the main electronic device 100.

According to various embodiments of the present disclosure, the sub control module 360 may collect exercise plan information (for example, exercise type information, exercise start time and end time information, and so on), measurement information of an exercise amount performed according to an exercise plan, and analysis information according to an exercise amount measurement result. The sub control module 360 may transmit at least one of the exercise related information to the main electronic device 100 according to a setting. For example, when a user finishes an exercise and arrives at a place (for example, a house and so on) where the main electronic device 100 and the output device 200 are located, the sub control module 360 may establish a communication channel with the main electronic device 100 on the basis of a companion function (for example, a function set to automatically establish a communication channel when it is located within a predetermined distance). Then, the sub control module 360 may automatically transmit the obtained exercise related information to the main electronic device 100.

Additionally, the sub-electronic device 300 may further include a second display (not shown) in relation to information display. The second display may output at least one screen relating to an operation of the sub-electronic device 300. For example, the second display may output at least one of a screen relating to a sensor information collection, a screen relating to an exercise related information connection, and a screen relating to the transmission of exercise related information. According to various embodiments of the present disclosure, the sub-electronic device 300 not including the second display may perform the above-mentioned information collection and delivery.

As mentioned above, according to various embodiments of the present disclosure, a sub-electronic device may include a sub communication module for receiving condition information relating to a condition satisfaction from an external electronic device (for example, a main electronic device) set to transmit collection information to an output device according to the specified condition satisfaction and a sub control module for performing a control to transmit information corresponding to the received condition information among the collected information to the external electronic device.

According to various embodiments of the present disclosure, when obtaining exercise related information, the sub control module may perform a control to transmit the exercise related information to the external electronic device.

According to various embodiments of the present disclosure, as exercise related information is obtained already or obtained currently, if a communication channel is automatically established with a companion device (for example, an electronic device set to automatically establish a communication channel when located within a predetermined distance with the external electronic device or the sub-electronic device), the sub control module may perform a control to transmit the exercise related information to the external electronic device.

According to various embodiments of the present disclosure, when specified sensor information is obtained or sensor information of greater than a specified reference value is obtained, the sub control module may perform a control to transmit the obtained sensor information to the external electronic device.

Figure 5:
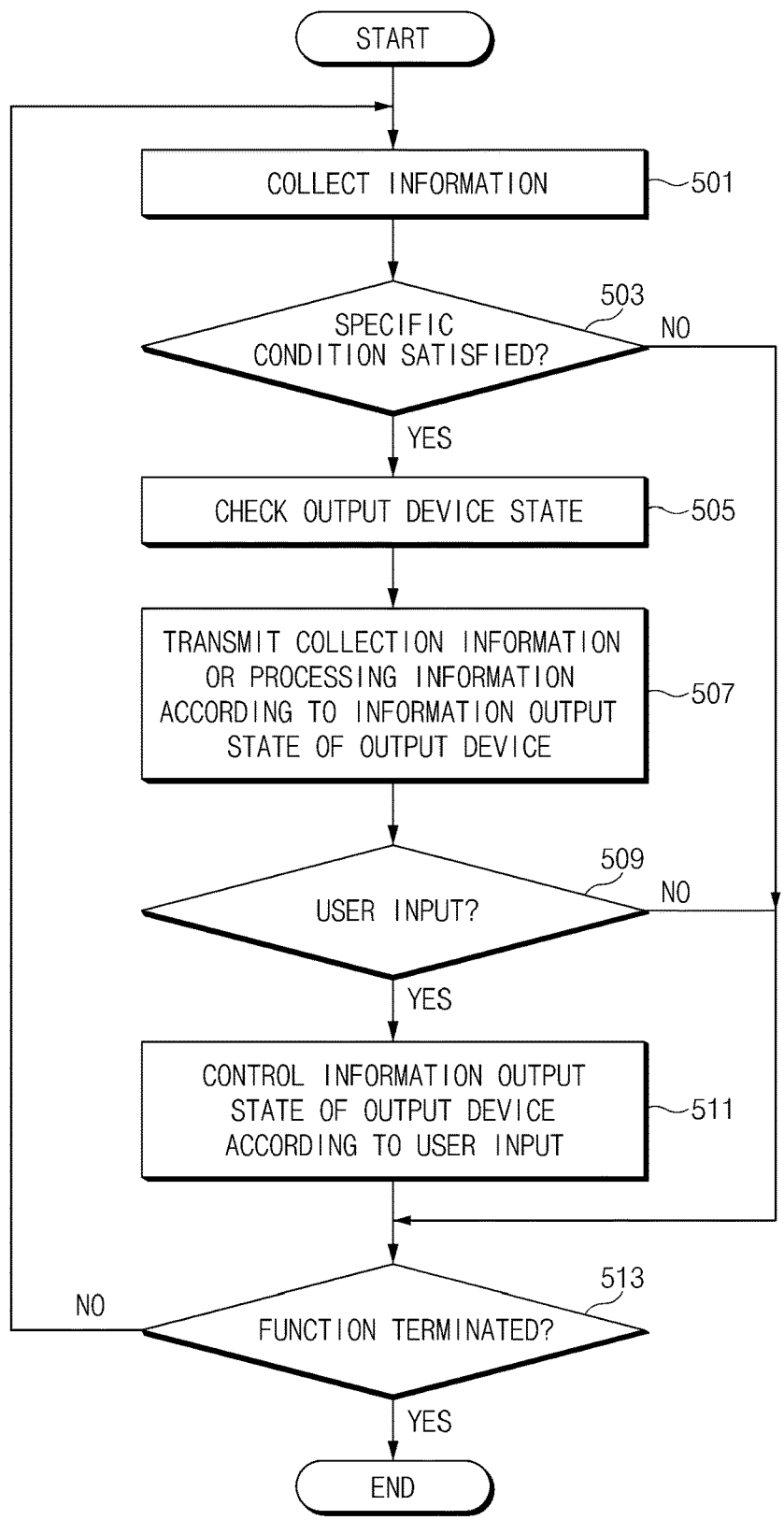
FIG. 5 is a flowchart providing an operational example of a main electronic device operating method according to various embodiments of the present disclosure.

FIG. 5 is a flowchart illustrating a main electronic device operating method according to various embodiments of the present disclosure.

Referring now to FIG. 5, in relation to the main electronic device operating method, the main control module 160 of the main electronic device 100 may perform an information collection relating to the set condition information 133 in operation 501. For example, the main control module 160 may receive sensor information or exercise related information as the collection information 131 from the sub-electronic device 300. Alternatively, the main control module 160 may receive weather information and traffic information provided from a web server device as the collection information. Alternatively, the main control module 160 may receive information for checking whether an alarm arrives (for example, a sleep wake up alarm or a preset task arrival alarm) as the collection information 131.

In operation 503, the main control module 160 may check whether there is the collection information 131 satisfying a specified condition. For example, the main control module 160 may check whether sensor information of greater than a specified threshold is received, whether there is an alarm reaching a specified time, or whether there is weather information or traffic information received at a specified time. Alternatively, the main control module 160 may check whether exercise related information is received from the sub-electronic device 300 or whether there is weather information collected according to a weather change (for example, forecast according to a drastic weather change such as hurricane, storm, hail, and so on). The specified condition may be changed variously according to a user changeable setting.

If there is the collection information 131 satisfying a specified condition, the main control module 160 may check a state of the output device 200 in operation 505. In relation to this, the main control module 160 may transmit a query for checking a state of the output device 200 and receive a response corresponding thereto. According to an embodiment of the present disclosure, the main control module 160 may confirm (i.e. verify) the turn-off state and turn-on state of the output device 200 and an execution state of a specified program (for example, a preference program specified according to a user setting or a watching history). According to various embodiments of the present disclosure, the main control module 160 may transmit collection information without checking a state of the output device 200. In this case, the checking of the state of the output device 200 in operation 505 may be omitted.

In operation 507, the main control module 160 may process collection information or processing information transmission according to an information output state of the output device 200. For example, the main control module 160 may adjust the form of information to be transmitted according to the turn-off state and turn-on state of the output device 200 and an execution state of a specified program (for example, a preference program specified according to a user setting or a watching history). For example, according to a state of the output device 200, the main control module 160 may transmit collection information as it is (for example, it is outputted in full screen when the output device 200 is in a turn-off state) or transmit a predetermined size of processing information including content of collected information (for example, it is outputted to a predetermined size of pop-up window or a partial area of the display module 240). Alternatively, the main control module 160 may transmit, to the output device, guide information (for example, an icon, an indicator, a predetermined length of text, or an image) for guiding that there is information to be outputted according to a state of the output device 200. When selecting a corresponding icon or indicator, the main control module 160 may transmit collection information or processing information to the output device 200. According to various embodiments of the present disclosure, when not checking a state of the output device 200, the main control module 160 may transmit collection information or a specified form of processing information to the output device 200 by default.

In operation 509, the main control module 160 may check whether a user input signal relating to an output device control occurs. In relation to this, the main control module 160 may output a control User Interface (UI) for controlling the output device 200. When a user input signal relating to an output device control occurs, the main control module 160 may perform an information output state control of an output device according to a user input in operation 511. For example, the main control module 160 may transmit, to the output device 200, a control signal for changing a channel of the output device 200 or a control signal for changing volume. Alternatively, the main control module 160 may stop the output of display information including at least one of the collection information and processing information outputted to the output device 200 according to the type of a control signal. Additionally or alternatively, the collection information may be in an audio information form and when the collection information is outputted to the output device 200, it may be outputted through an audio module of the output device 200. The main control module 160 may transmit, to the output device 200, a control signal for stopping an audio output relating to collection information in correspondence to a user control and perform a control to stop the audio output.

According to various embodiments of the present disclosure, if there is no user input relating to an output device control, the main control module 160 may skip operation 511. In operation 513, the main control module 160 may check whether there is an input event occurrence relating to function termination. If there is no function termination related event, an electronic device (or a processor) may branch into operation 501 and perform subsequent operations again. If there is no function termination related event occurrence, the main control module 160 may branch into operation 511 and perform subsequent operations again. On the other hand, if there is no collection information 131 satisfying a specified condition, the main control module 160 may skip operations 505, 507, 509, and 511.

As mentioned above, according to various embodiments of the present disclosure, a method of operating a main electronic device relating to a situation specific information sharing support may include storing collection information, checking whether the stored collection information matches specified condition information, and transmitting at least one of the collection information matching the condition information and processing information processed based on the collection information to an output device.

According to various embodiments of the present disclosure, the storing of the collection information may include receiving, as the collected information, biometric information including at least one of heart rate sensor information, body temperature information, blood flow related information, and oxygen saturation information, and storing it.

According to various embodiments of the present disclosure, the method may further include transmitting biometric information of greater than a specified size to the output device.

According to various embodiments of the present disclosure, when a sub-electronic device in exercise function execution is connected, the method may further include at least one of receiving exercise related information including exercise plan information, exercise measurement amount information, and exercise result analysis information from the sub-electronic device and transmitting the exercise related information to the output device.

According to various embodiments of the present disclosure, the method may further include at least one of collecting at least one of weather information, traffic information, and information on whether an alarm arrives, and transmitting the collected information to the output device.

According to various embodiments of the present disclosure, the transmitting of the collected information may include transmitting the collection information as it is or transmitting processing information processed in a specified form according to a display state of the output device.

According to various embodiments of the present disclosure, the transmitting of the collected information may include, when the output device is in a turn-off state, after performing a control to turn-on the output device, transmitting the collection information to output it in full screen of the output device.

According to various embodiments of the present disclosure, the transmitting of the collected information may include, when the output device is in a turn-on state, converting the collection information into a specified predetermined size of processing information to output it to the output device.

According to various embodiments of the present disclosure, the transmitting of the collected information may include, if a specified program execution screen is outputted while the output device is in a turn-on state, transmitting a predetermined size of guide information for guiding information output to output it to the output device.

According to various embodiments of the present disclosure, the transmitting of the collected information may include transmitting the processing information obtained by processing the collection information into a specified form to the output device according to at least one of the type of the collection information, a collection time point of collection information, a collection location of collection information, program type information relating to collection information, external electronic device type information relating to collection information, and program type information of an external electronic device relating to collection information.

As mentioned above, according to various embodiments of the present disclosure, an operation method of a main electronic device relating to a situation specific information sharing support may include: checking a specified condition; if the specified condition is satisfied, performing a control to allow an output state of a specified output device to be in a state for outputting specified collection information; and transmitting the collection information to the output device.

According to various embodiments of the present disclosure, the checking of the specified condition may include checking condition information relating to the collection information and the transmitting of the collection information may include when the collection information satisfies the condition information, transmitting the collection information to the output device.

According to various embodiments of the present disclosure, the performing of the control comprises, when the output device is connected to a specified network, performing a control to allow the output device to be in a state for outputting the collection information through the specified network.

According to various embodiments of the present disclosure, the performing of the control may include: performing the output device discovery; if the output device is found, attempting a connection with the found output device; and if the output device discovery is failed, displaying the collection information.

According to various embodiments of the present disclosure, the method may further include, when the output device connection is failed, displaying the collection information.

According to various embodiments of the present disclosure, the method may further include, when the output device discovery is failed, outputting guide information according to the discovery failure.

According to various embodiments of the present disclosure, the performing of the control may include, when the found output device is connectable (i.e. operatively connectable or connected), performing a control operation that changes the connected output device to enter into a state for outputting the collection information.

According to various embodiments of the present disclosure, the method may further include, when the output device connection is failed, displaying the collection information.

According to various embodiments of the present disclosure, the method may further include transmitting, to the output device, a message for requesting an output stop of the collection information in correspondence to a user input.

According to various embodiments of the present disclosure, the transmitting of the collection information may include transmitting, to the output device, the collection information including at least one of schedule information, weather information, and traffic information.

According to various embodiments of the present disclosure, the transmitting of the collection information may include transmitting sensing information including at least one of heart rate sensor information, temperature information, humidity information, illumination information, body temperature information, blood flow related information, and oxygen saturation information, which are collected by a sensor module included in a sub-electronic device, as the collected information to the output device.

According to various embodiments of the present disclosure, the transmitting of the collection information may include transmitting sensing information of greater than a specified size to the output device.

According to various embodiments of the present disclosure, the transmitting of the collection information may include, when a sub-electronic device in exercise function execution is connected, receiving exercise related information including at least one of exercise plan information, exercise measurement amount information, and exercise result analysis information from the sub-electronic device and transmitting the exercise related information as the collection information to the output device.

Figure 6:
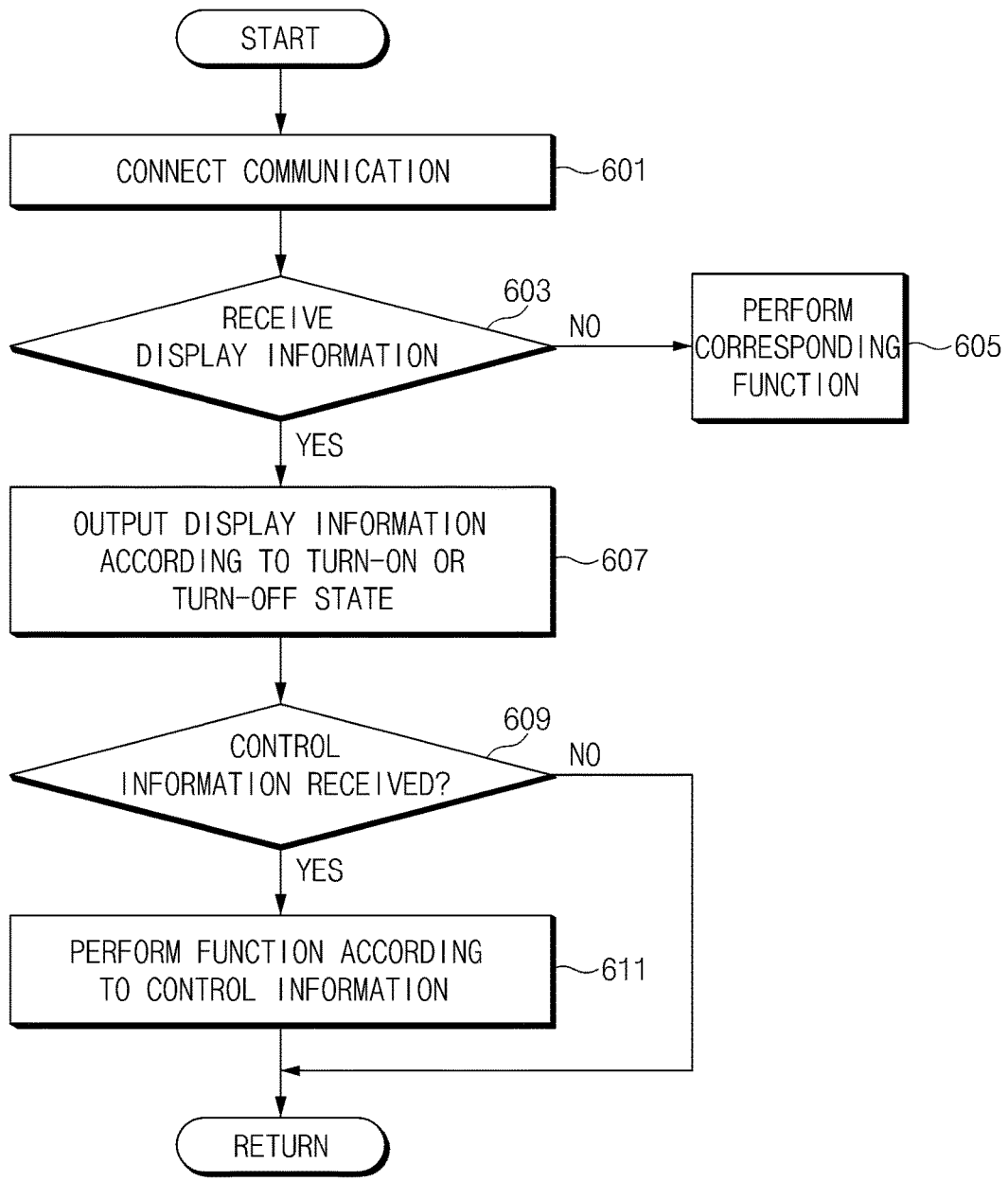
FIG. 6 is a flowchart providing an operational example of an output device operating method according to various embodiments of the present disclosure.

FIG. 6 is a flowchart illustrating an output device operating method according to various embodiments of the present disclosure.

Referring now to FIG. 6, in relation to an output device operating method according to various embodiments of the present disclosure, the output control module 260 of the output device 200 may perform a communication connection (i.e. communicatively couple) with the main electronic device 100 in operation 601. Alternatively, the output control module 260 may have a communication standby state for receiving display information including at least one of the collection information 131 and processing information transmitted from the main electronic device 100. For example, the output control module 260 may have a state of being connected to an Access Point supporting a WiFi network. Alternatively, the output control module 260 may activate a Bluetooth communication module and have a standby state of receiving display information.

When an event occurs, in operation 603 the output control module 260 may check whether an event relating to the reception of display information (for example, at least one of collection information and processing information). If there is no event relating to display information reception, the output control module 260 may perform processing to perform a corresponding function corresponding to an event type in operation 605. If there is an event relating to display information reception, the output control module 260 may control a display information output according to a turn-on or turn-off state in operation 607. According to an embodiment of the present disclosure, when the display module 240 is in a turn-off state, the output control module 260 may change the display module 240 into a turn-on state and output received display information in full screen. According to an embodiment of the present disclosure, when the display module 240 is in a turn-on state, the output control module 260 may output received display information to a predetermined size of area. According to various embodiments of the present disclosure, regardless of a turn-on or turn-off state, the output control module 260 may perform a control to output received display information in a full screen or output the display information having a predetermined size in a predetermined area.

In operation 609, the output control module 260 may check whether control information is received from the main electronic device 100. When control information is received, the output control module 260 may process a function performance according to the control information in operation 611. For example, the output control module 260 may stop the output of display information outputted according to content of control information. Alternatively, the output control module 260 may control a program execution corresponding to a channel change or corresponding control information according to content of control information. According to various embodiments of the present disclosure, when a specified time elapses without receiving additional control information, the output control module 260 may perform a control to remove display information from the display module 240. Alternatively, the output control module 260 may remove collection information (or processing information) from the display module 240 by a collection information removal request (or a processing information removal request) through an input/output device prepared in the output device 200. If there is no control information reception, the output control module 260 may skip operation 611.

After a function performance according to control information, the output control module 260 may branch into operation 609 and support a function performance according to another control information or branch into operation 601 and maintain a communication connection (or communication standby) state.

As disclosed above, according to various embodiments of the present disclosure, an output device operating method may include receiving a state control related control signal from an external electronic device (for example, a main electronic device) through at least one of a specified network and a short range communication channel, performing a control to be in a state of outputting collection information according to a received control signal, and outputting received collection information.

According to various embodiments of the present disclosure, the method may further include outputting a beaconing signal when a display module is in a turn-off state or a sleep state in relation to the short range communication channel establishment.

According to various embodiments of the present disclosure, the method may further include transmitting state information of an output device to the external electronic device.

Figure 7:
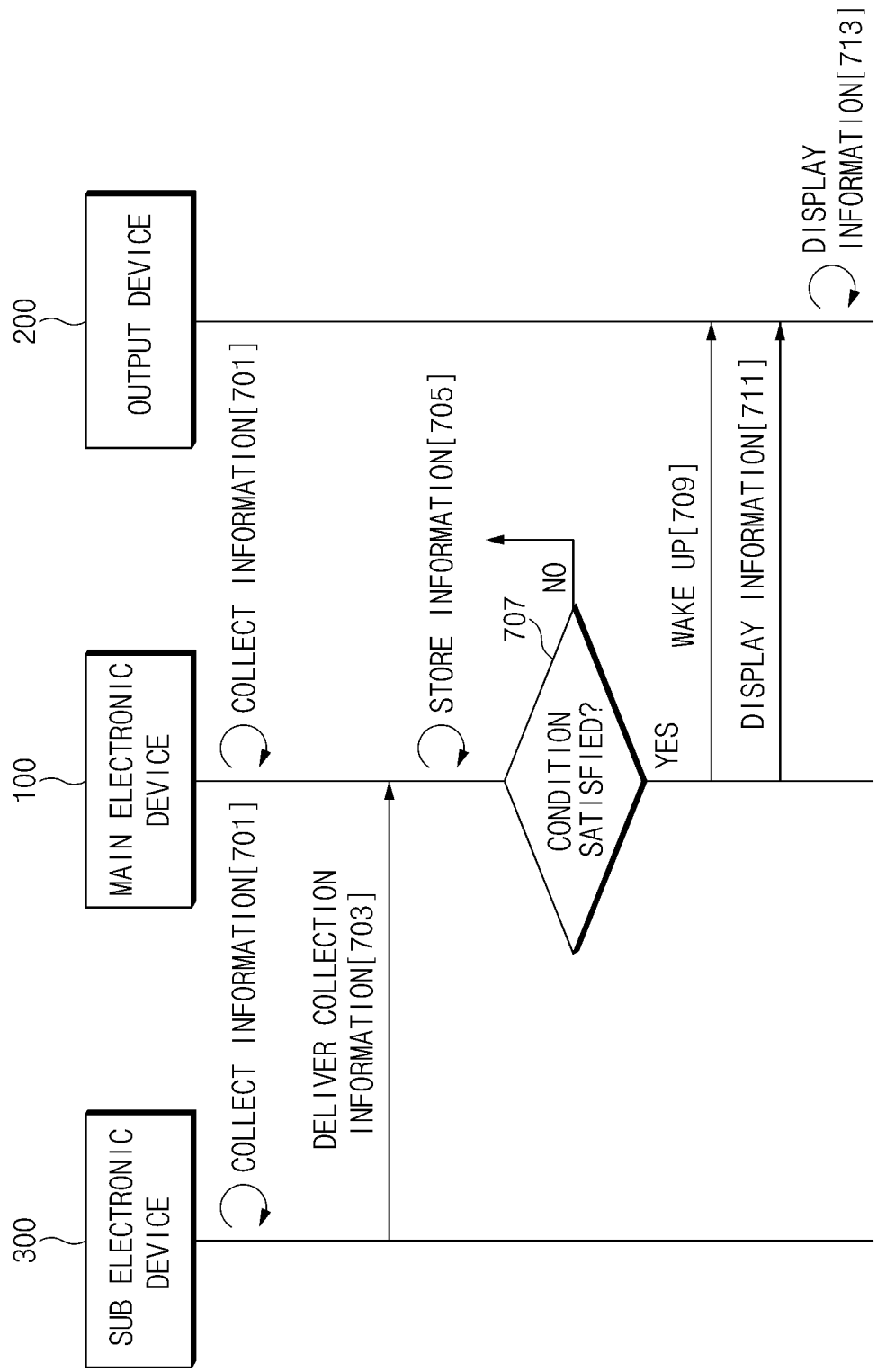
FIG. 7 is a view illustrating signal flow of a situation-specific information sharing according to various embodiments of the present disclosure.

FIG. 7 is a view illustrating a situation specific information sharing support related signal flow according to various embodiments of the present disclosure.

Referring to FIG. 7, in relation to a situation specific information sharing support according to various embodiments of the present disclosure, in operation 701, at least one of a sub-electronic device 300 (for example, the sub-electronic device 300 of FIG. 1) and a main electronic device 100 (for example, the main electronic device 100 of FIG. 1) may collect information (for example, weather information, information on whether an alarm arrives, or oxygen saturation information) according to a user input or a specified setting. In operation 701, when information is collected, the sub-electronic device 300 may transmit collected information to the main electronic device 100. Alternatively, if specified information (for example, collection information set to be transmitted to the main electronic device 100) exists among collected information, the sub-electronic device 300 may transmit corresponding specified information to the main electronic device 100. For example, when biometric information such as oxygen saturation information, heart rate sensor information, and exercise related information is set as specified information, the sub-electronic device 300 may transmit corresponding biometric information to the main electronic device 100.

In operation 705, the main electronic device 100 may store information. For example, the main electronic device 100 may store received information as the collection information 131 in the first memory 130. In operation 707, the main electronic device 100 may check whether the stored collection information 131 satisfies a specified condition. In relation to this, the main electronic device 100 may perform an operation for comparing the preset condition information 133 and the collection information 131. If the collection information 131 does not satisfy the specified condition, the main electronic device 100 may discard the collection information 131 or accumulate and store the collection information 131 according to a setting.

If the collection information 131 satisfies the specified condition, the main electronic device 100 may transmit a message (for example, a "wake up" message) for activating the output device 200 in operation 709. For example, the main electronic device 100 may transmit a wake up message for waking up the output device 200 to the output device 200 through an access point or a Bluetooth communication channel. During this operation, the main electronic device 100 may transmit a query for checking a display state of the output device 200 to the output device 200 and when receiving response information corresponding to a state that a display state is a turn-on state from the output device 200, may omit the transmission of the wake up message.

In operation 711, the main control device 100 may transmit display information including at least one of the collection information 131 and processing information to the output device 200. For example, the main electronic device 100 may generate processing information according to the type of the collection information 131 or a level of the collection information. The type of the collection information 131 may include a collection time point of the collection information 131, a location where the collection information 131 is collected, a program type relating to the collection information 131, the type of an external electronic device relating to the collection information 131, and a program type of an external electronic device relating to the collection information 131. The level of the collection information 131, for example, may be determined in correspondence to a relative emergency or a relative importance with respect to another information. The emergency or importance may be predefined or may be determined according to a user setting and a policy.

In operation 713, the output device 200 may output received display information to the display module 240. According to various embodiments of the present disclosure, the output device 200 may receive only the collection information 131 as display information. The output device 200 may convert the collection information 131 into a specified form of processing information and output it according to a state of the display module 240 or may output the form of the received collection information 131 as it is. For example, when the display module 240 is in a turn-off state, the output device 200 may change the display module 240 into a turn-on state and output the collection information 131 as it is (or without additional size or form processing) or may output the collection information 131 in full screen of the display module 240. When the display module 240 is in a turn-on state, the output device 200 may convert the collection information 131 into a predetermined size of processing information and perform a control to output it to a specified position of the display module 240. For example, the output device 200 may output processing information obtained by reducing the collection information 131 to a predetermined size.

Figure 8:
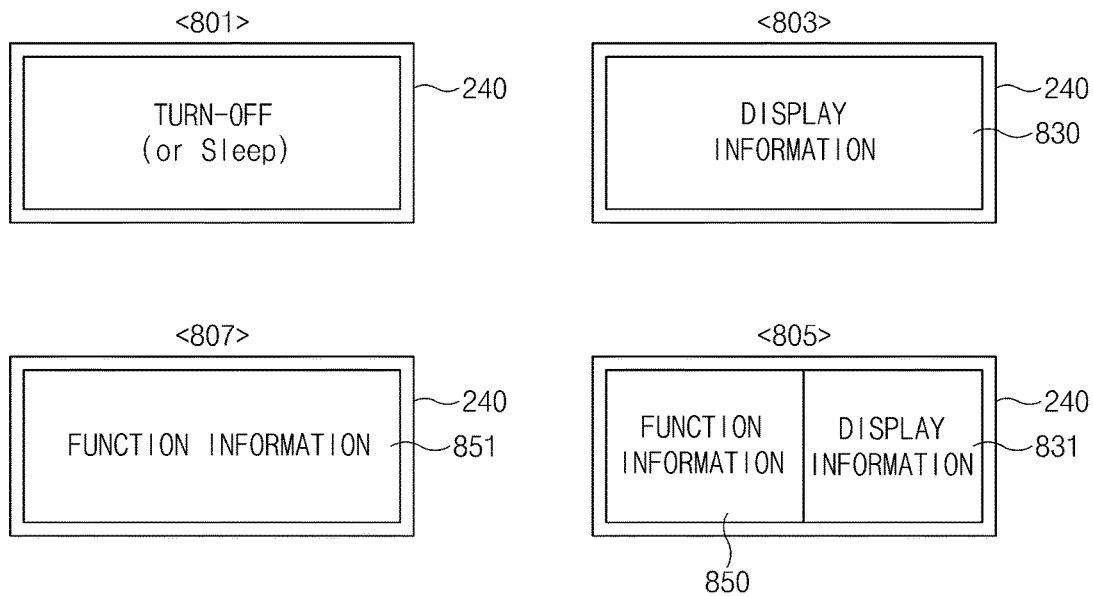
FIG. 8 is an illustration of a screen interface of an output device according to various embodiments of the present disclosure.

FIG. 8 is a view illustrating a screen interface of an output device according to various embodiments of the present disclosure.

Referring now to FIG. 8, as shown in a screen 801, the display module 240 of the output device 200 may be in a turn-off state if there is no additional user control or a turn-off state related control signal occurs. Herein, the turn-off state may be a state in which the power supply of the display module 240 is stopped. The output device 200 may maintain a communication module to be in a standby state in order to receive collection information or processing information.

When collection information or processing information is received in a turn-off state, as shown in a screen 803, the output device 200 may output display information 830 (for example, collection information or processing information) in full screen. Alternatively, the output device 200 may perform a control to output the display information 830 in a specified size smaller than the total size of the display module 240 (or greater than a predetermined size).

According to various embodiments of the present disclosure, as shown in a screen 805, when the display module 240 is in a turn-on state (for example, a state in which power is supplied or a state in which a channel screen or a program execution screen set by default is outputted), the output device 200 may output display information 831. Herein, the display information 831 may be information obtained by reducing the display information 830 to a predetermined size (for example, reducing content also) or rearranging content in relation to the reduction (for example, reducing the size of an area for displaying content while maintaining the size of the content), or deleting partial content. On the other hand, the display module 240 may output a specified channel according to a turn-on state or function information 850 according to program execution or function execution. The display information 831 may be overlaid and displayed on the function information 850 or may divide the display module 240 by a predetermined size and then be outputted to divided areas not to overlap the function information 850.

According to various embodiments of the present disclosure, when the output of the display information 830 or the display information 831 is stopped, as shown in a screen 807, the output device 200 may output the function information 851 in full screen. Alternatively, when the function information 851 comprises a screen relating to a specified program (for example, a program specified as a user preference program), the output device 200 may not output additional display information or may output an effect (for example, a screen flashing or a specified beep sound or guide sound output) for guiding display information reception. Alternatively, as described above, guide information (for example, a predetermined size of icon, indicator, text, and so on) for guiding display information reception may be outputted. According to various embodiments of the present disclosure, when received display information is information (for example, biometric information of greater than a specified size) of greater than a predetermined rating (or level or priority), regardless of a state of the display module 240, as shown in a screen 803, the display information 830 may be outputted in full screen. The rating may be pre-specified according to the type of a program or may be specified (or changed) by a user setting.

According to various embodiments of the present disclosure, the output device 200 may distinguish and output information on a source of display information and an acquisition time of display information. For example, when display information includes a plurality of information, the output device 200 may output type information of a device (for example, a sub-electronic device, a web server device, and a main electronic device) providing corresponding information and program type information relating to corresponding information. Additionally, the output device 200 may output an information collection time point and an information collection location together.

Figure 9:
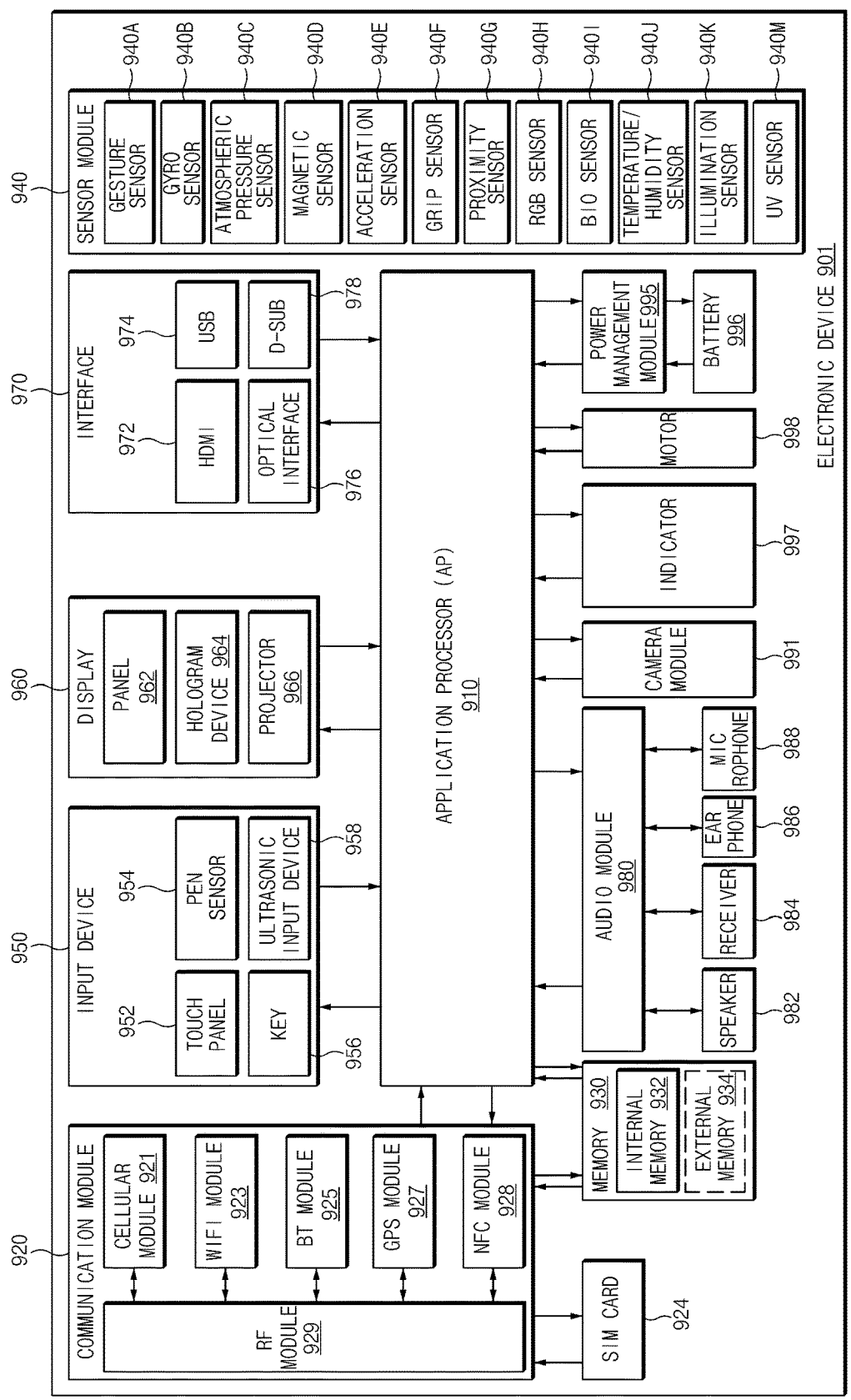
FIG. 9 is a block diagram illustrating an electronic device according to various embodiments of the present disclosure.

FIG. 9 is a block diagram illustrating an electronic device according to various embodiments of the present disclosure.

Referring to FIG. 9, the electronic device 900, for example, may include all or part of at least one of the electronic devices 100, 200, and 300 (for example, a main electronic device, an output device, and a sub-electronic device). The electronic device 900 may include at least one processor 910 (for example, the control module and an application processor (AP)), a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998.

The processor 910 may control a plurality of hardware or software components connected thereto and also may perform various data processing and operations by executing an operating system or an application program. The processor 910 may be implemented with a system on chip (SoC), for example. According to an embodiment of the present disclosure, the processor 910 may further include a graphic processing unit (GPU) (not shown) and/or an image signal processor. The processor 910 may include at least part (for example, the cellular module 921) of components shown in FIG. 9. The processor 910 may load commands or data received from at least one of other components (for example, nonvolatile memory) and process them and may store various data in a nonvolatile memory.

The communication module 920 may have the same or similar configuration to at least one of the communication modules 110, 210, and 310. The communication module 920 may include a cellular module 921, a WiFi module 923, a BT module 925, a GPS module 927, an NFC module 928, a radio frequency (RF) module 929, and a Bluetooth Low Energy (BLE) module (not shown).

The cellular module 921, for example, includes structure to provide voice calls, video calls, text service, or internet service through communication network. According to an embodiment of the present disclosure, the cellular module 921 may perform a distinction and authentication operation on the electronic device 900 in a communication network by using a SIM (for example, a SIM card) 924. According to an embodiment of the present disclosure, the cellular module 921 may perform at least part of a function that the processor 910 provides. According to an embodiment of the present disclosure, the cellular module 921 may further include a communication processor (CP).

Each of the WiFi module 923, the BT module 925, the GPS module 927, and the NFC module 928 comprise hardware and may include, for example, a processor having circuitry for processing data transmitted/received through a corresponding module. According to an embodiment of the present disclosure, at least part (for example, at least one) of the cellular module 921, the WiFi module 923, the BT module 925, the GPS module 927, and the NFC module 928 may be included in one integrated chip (IC) or IC package.

The RF module 929, for example, may transmit/receive communication signals (for example, RF signals). The RF module 929, for example, may include a transceiver, a power amp module (PAM), a frequency filter, a low noise amplifier (LNA), or an antenna. According to another embodiment of the present disclosure, at least one of the cellular module 921, the WiFi module 923, the Bluetooth module 925, the GPS module 927, and the NFC module 928 may transmit/receive RF signals through a separate RF module.

The SIM 924, for example, may include a card including a SIM and/or an embedded SIM, and an embedded Secure Element (eSE) and also may include unique identification information (for example, an integrated circuit card identifier (ICCID)) or subscriber information (for example, an international mobile subscriber identity (IMSI)).

The memory 930 (for example, the memories 130, 230, and 330) may include an internal memory 932 or an external memory 934. The internal memory 932 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 934 may further include flash drive, for example, compact flash (CF), secure digital (SD), micro Micro-SD, Mini-SD, extreme digital (xD), (MultiMediaCard (MMC), or a memorystick. The external memory 934 may be functionally and/or physically connected to the electronic device 900 through various interfaces.

The sensor module 940 measures physical quantities or detects an operating state of the electronic device 900, thereby converting the measured or detected information into electrical signals. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G; a color sensor 940H (for example, a red, green, blue (RGB) sensor), a biometric sensor 940I, a temperature/humidity sensor 940J, an illumination sensor 940K, and an ultra violet (UV) sensor 940M. Additionally or alternatively, the sensor module 940 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 940 may further include a control circuit for controlling at least one sensor therein. According to an embodiment of the present disclosure, the electronic device 900 may further include a processor configured to control the sensor module 940 as part of or separately from the processor 910 and thus may control the sensor module 940 while the processor 910 is in a sleep state.

The input device 950 may include a touch panel 952, a (digital) pen sensor 954, a key 956, or an ultrasonic input device 958. The touch panel 952 may use at least one of capacitive, resistive, infrared, or ultrasonic methods, for example. Additionally, the touch panel 952 may further include a control circuit. The touch panel 952 may further include a tactile layer to provide tactile response to a user.

The (digital) pen sensor 954, for example, may include a sheet for recognition as part of a touch panel or a separate sheet for recognition. The key 956 may include a physical button, an optical key, or a keypad, for example. The ultrasonic input device 958 may detect ultrasonic waves generated from an input tool through a microphone (for example, the microphone 1588) in order to check data corresponding to the detected ultrasonic waves.

The display 960 (for example, the display 140 and the display module 240) includes hardware, for example, a panel 962, a hologram device 964, or a projector 966. The panel 962 may be implemented to be flexible, transparent, or wearable, for example. The panel 962 and the touch panel 952 may be configured with one module. The hologram 964 may show three-dimensional images in the air by using the interference of light. The projector 966 may display an image by projecting light on a screen. The screen, for example, may be placed inside or outside the electronic device 900. According to an embodiment of the present disclosure, the display 960 may further include a control circuit for controlling the panel 962, the hologram device 964, or the projector 966.

The interface 970 includes hardware such as a high-definition multimedia interface (HDMI) 972, a universal serial bus (USB) 974, an optical interface 976, or a D-sub-miniature (sub) 978, for example. The interface 970, for example, may include a mobile high-definition link (MHL) interface, a secure Digital (SD) card/multi-media card (MMC) interface, or an infrared data association (IrDA) standard interface.

The audio module 980 contains hardware that can convert (transduce) sound into electrical signals and convert electrical signals into sounds. The audio module 980 may process sound information inputted/outputted through a speaker 982, a receiver 984, an earphone 986, or a microphone 988.

The camera module 991, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 995 may manage the power of the electronic device 900. According to an embodiment of the present disclosure, the power management module 995 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 996, or a voltage, current, or temperature thereof during charging. The battery 996, for example, may include a rechargeable battery and/or a solar battery.

The indicator 997 may display a specific state of the electronic device 900 or part thereof (for example, the processor 910), for example, a booting state, a message state, or a charging state. The motor 998 may convert electrical signals into mechanical vibration and may generate vibration or a haptic effect. Although not shown in the drawings, the electronic device 900 may include a processing device (for example, a GPU) for mobile TV support. A processing device for mobile TV support may process media data according to the standards such as digital multimedia broadcasting (DMB), digital video broadcasting (DVB), or mediaFLO.

Figure 10:
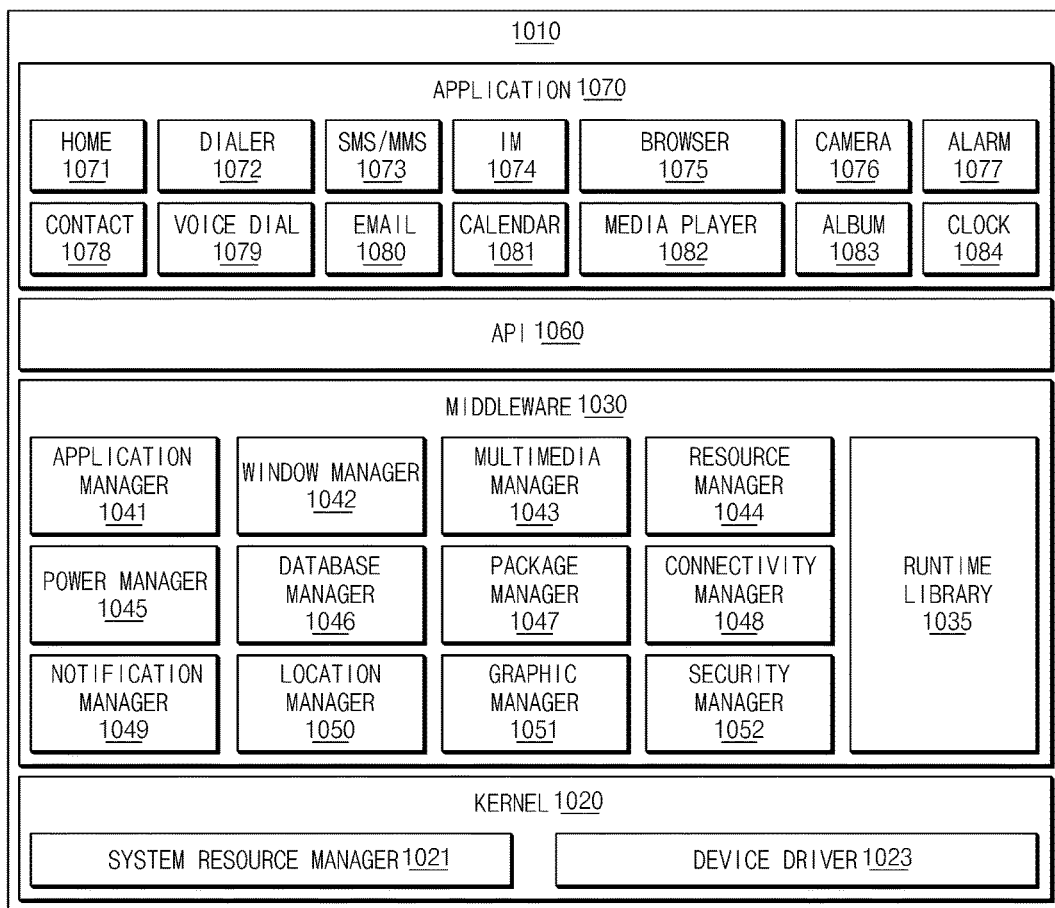
FIG. 10 is a block diagram illustrating a program module according to various embodiments of the present disclosure.

FIG. 10 is a block diagram illustrating a program module according to various embodiments of the present disclosure. An artisan should understand that the program module does not constitute software per se or pure software, and the programs are all executed by at least hardware.

Referring now to FIG. 10, according to an embodiment of the present disclosure, the program module 1010 may include an operating system (OS) for controlling a resource relating to an electronic device (for example, the electronic devices 100, 200, and 300) and/or various applications running on the OS. The OS, for example, may include android, iOS, windows, symbian, tizen, or bada.

The program module 1010 may include a kernel 1020, a middleware 1030, an API 1060, and/or an application 1070. At least part of the program module 1010 may be preloaded on an electronic device or may be downloaded from an external electronic device (for example, a server).

The kernel 1020, for example, may include a system resource manager 1021 or a device driver 1023. The system resource manager 1021 may perform the control, allocation, or retrieval of a system resource. According to an embodiment of the disclosure, the system resource manager 1021 may include a process management unit, a memory management unit, or a file system management unit. The device driver 1023, for example, may include a display driver, a camera driver, a Bluetooth driver, a sharing memory driver, a USB driver, a keypad driver, a WiFi driver, an audio driver, or an inter-process communication (IPC) driver.

The middleware 1030, for example, may provide a function that the application 1070 requires commonly, or may provide various functions to the application 1070 through the API 1260 in order to allow the application 1070 to efficiently use a limited system resource inside the electronic device. According to an embodiment of the disclosure, the middleware 1030 (for example, the middleware 143) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035, for example, may include a library module that a complier uses to add a new function through a programming language while the application 1070 is running. The runtime library 1035 may perform a function on input/output management, memory management, or an arithmetic function.

The application manager 1041, for example, may mange the life cycle of at least one application among the applications 1070. The window manager 1042 may manage a GUI resource used in a screen. The multimedia manager 1043 may recognize a format for playing various media files and may encode or decode a media file by using the codec corresponding to a corresponding format. The resource manager 1044 may manage a resource such as a source code, a memory, or a storage space of at least any one of the applications 1070.

The power manager 1045, for example, may operate together with a basic input/output system (BIOS) to manage the battery or power and may provide power information necessary for an operation of the electronic device. The database manager 1046 may create, discover, or modify a database used in at least one application among the applications 1070. The package manager 1047 may manage the installation or update of an application distributed in a package file format.

The connectivity manger 1048 may manage a wireless connection such as WiFi or Bluetooth. The notification manager 1049 may display or notify an event such as arrival messages, appointments, and proximity alerts to a user in a manner of not interrupting the user. The location manager 1050 may manage location information on an electronic device. The graphic manager 1051 may manage a graphic effect to be provided to a user or a user interface relating thereto. The security manager 1052 may provide various security functions necessary for system security or user authentication. According to an embodiment, when an electronic device (for example, the electronic devices 100, 200, and 300) includes a phone function, the middleware 1030 may further include a telephony manager for managing a voice or video call function of the electronic device.

The middleware 1030 may include a middleware module for forming a combination of various functions of the above-mentioned components. The middleware 1030 may provide a module specialized for each type of OS to provide differentiated functions. Additionally, the middleware 1030 may delete part of existing components or add new components dynamically.

The API 1060, for example, as a set of API programming functions, may be provided as another configuration according to OS. For example, in the case of android or iOS, one API set may be provided for each platform and in the case Tizen, at least two API sets may be provided for each platform.

The application 1070, for example, may include at least one application for providing functions such as a home 1071, a dialer 1072, an SMS/MMS 1073, an instant message 1074, a browser 1075, a camera 1076, an alarm 1077, a contact 1078, a voice dial 1079, an e-mail 1080, a calendar 1081, a media player 1082, an album 1083, a clock 1084, health care (for example, measure an exercise amount or blood sugar), or environmental information provision (for example, provide air pressure, humidity, or temperature information).

According to an embodiment, the application 1070 may include an application (hereinafter referred to as "information exchange application") for supporting information exchange between the electronic device (for example, the electronic device 100) and an external electronic device (for example, the electronic devices 200 and 300). The information exchange application, for example, may include a notification relay application for relaying specific information to the external device or a device management application for managing the external electronic device.

For example, the notification relay application may have a function for relaying to an external electronic device (for example, electronic devices 200 and 300) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (for example, the turn-on/turn-off of an external electronic device itself (or some components) or the brightness (or resolution) adjustment of a display) of an external electronic device (for example, the electronic devices 200 and 300) communicating with an electronic device (for example, the electronic device 100), an application operating on an external electronic device, or a service (for example, call service or message service) provided from an external electronic device.

According to an embodiment of the disclosure, the application 1070 may include a specified application (for example, a health care application of a mobile metical device) according to the property of an external electronic device (for example, the electronic devices 200 and 300). According to an embodiment, the application 1070 may include an application received from an external electronic device. According to an embodiment of the disclosure, the application 1070 may include a preloaded application or a third party application downloadable from a server. The names of components in the program module 1010 according to the shown embodiment may vary depending on the type of OS.

According to various embodiments of the present disclosure, at least part of the program module 1010 may be implemented with firmware, hardware, or a combination thereof. At least part of the programming module 1010, for example, may be implemented (for example, executed) by a processor. At least part of the programming module 1010 may include a module, a program, a routine, sets of instructions, or a process to perform at least one function, for example.

Figure 11:
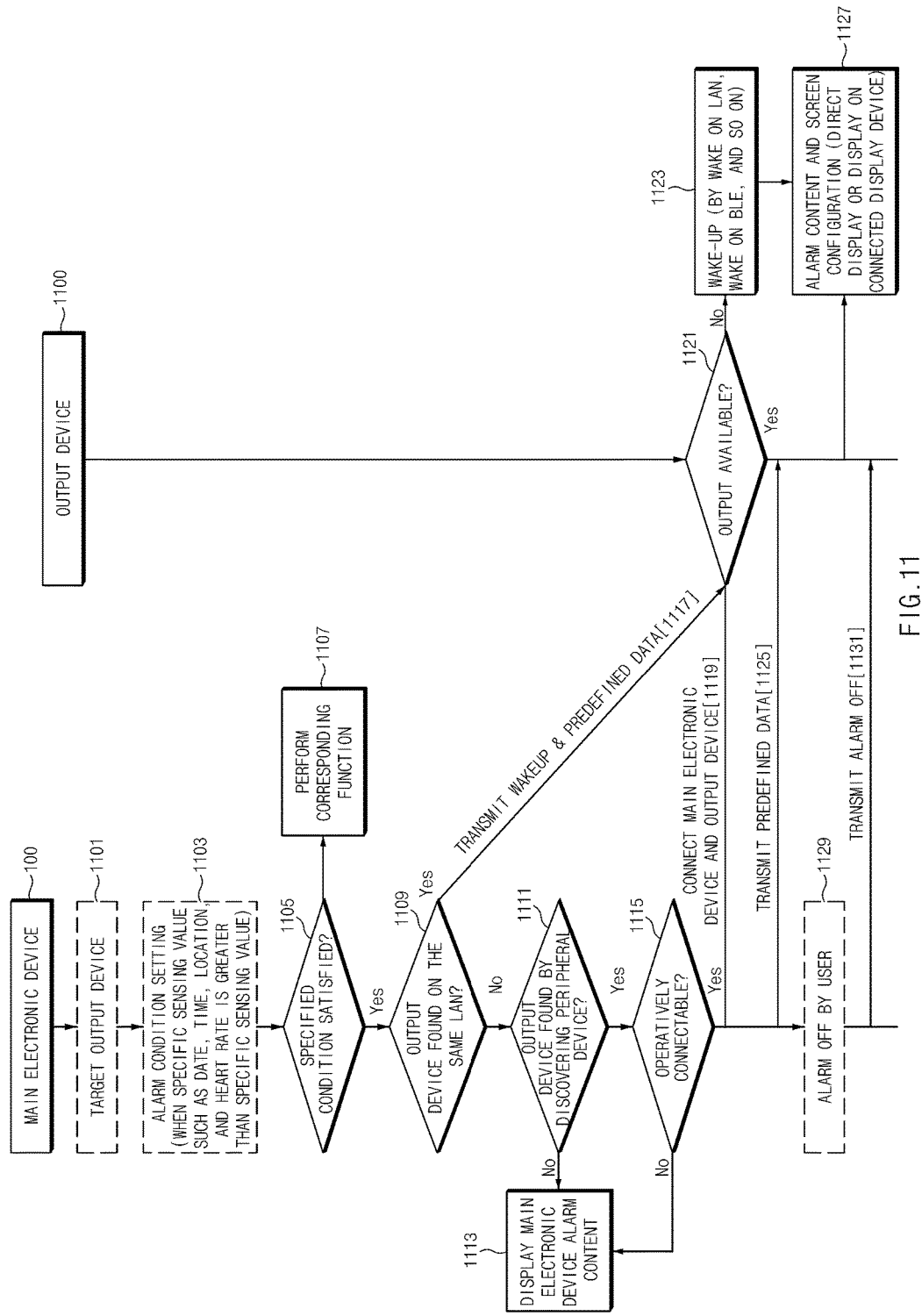
FIG. 11 is an illustration of a signal flow between information sharing related devices according to various embodiments of the present disclosure.

FIG. 11 is a view illustrating a signal flow between information sharing related devices according to various embodiments of the present disclosure.

Referring to FIG. 11, in operation 1101, the main electronic device 100 may set a target output device (or a device, for example, a media device or a media apparatus, for outputting content or information to a display module, an audio device, or another electronic device) in correspondence to a user input or a setting information reception. For example, the main electronic device 100 may receive an input of at least one of device identification information (for example, a device serial number, the MAC address of a device, and the network identification information of a device) of an output device. In operation 1103, the main electronic device 100 may receive an alarm condition setting according to a user input or from an external electronic device. The alarm condition setting, for example, may be a case that a specific sensing value such as a date, a time, a location, and a heart rate is greater than a reference value. According to various embodiments of the present disclosure, the alarm may include a specified condition (or the condition information 133) for allowing the main electronic device 100 to transmit information to an output device.

In operation 1105, the main electronic device 100 may check whether the specified condition (for example, the condition information 133) is satisfied. Whether the condition is satisfied may include whether an alarm condition setting arrives (for example, whether a specified alarm time arrives) or whether a specified setting is satisfied (for example, whether it is at a specified location). Whether a specified condition is not satisfied, the main electronic device 100 may control a function execution set in operation 1107 or a function execution according to a user input. Alternatively, the main electronic device 100 may maintain a sleep state.

When a specified condition is satisfied, in operation 1109, the main electronic device 100 may check whether a specified output device 1100 is found on the same LAN. If the specified output device 1100 is not found on the same LAN, in operation 1111, the main electronic device 100 may check whether the output device 1100 is found by performing a peripheral device discovery (e.g., the output device discovery operation previously discussed). During this operation, when the output device 1100 is not found, in operation 1113, the main electronic device 100 may perform an alarm content display. For example, the main electronic device 100 may output alarm content to the first display 140.

If the output device 1100 is found by performing a output device discovery, in operation 1115, the main electronic device 100 may check whether it is operatively connected to the found output device 1100. If it is not operatively connected to the found output device 1100, the main electronic device 100 may branch into operation 1113 and process an alarm display performance.

When the specified output device 1100 is found on the same LAN in operation 1109, the main electronic device 100 may output a wakeup message and predefined data (for example, data, for example, the collection information 131, to be transmitted to the output device 1100 according to alarm condition satisfaction) to the output device 1100 in operation 1117. Additionally, when it is operatively connected to the found output device 1100 in operation 1115, in operation 1110, the main electronic device 100 may request the connection of the output device 1100 with the main electronic device 100 from the output device 1100.

In operation 1121, the output device 1100 may check whether the output of predefined data (or collection information) is possible. Alternatively, when the output device 1100 is connected to a specified network, the output device 1100 may check whether the output of the predefined data (or the collection information 131) received through the specified network is possible.

In the case of an output unavailable state (for example, a turn-off state or a state of not outputting predefined data or collection information), the output device 1100 may switch an output device into a wakeup state in operation 1123 in correspondence to a request of the main electronic device 100. In relation to this, if it is operatively connected to the found output device 1100, the main electronic device 100 may perform a control on the connected output device 1100 to output the predefined data (or the collection information 131). For example, the output device 1100 may switch into a wakeup state in correspondence to the reception of a LAN based wakeup control signal or a BLE based wakeup signal transmitted by the main electronic device 100. During this operation, the output communication module of the output device 110 may be an available state (for example, BLE On) or the output control module of the output device 1100 may be an unavailable state (for example, AP Off). In this case, the main electronic device 100 may perform a control to wake up the output control module (or an AP) of the output device 1100 in order to allow the output device 1100 (or a media device) to output predefined data (or collection information). According to various embodiments of the present disclosure, if the output device 1100 is in an information output available state (or a wake-up state) in operation 1121, predefined data (or collection information) may be outputted to at least a portion of the screen of the output device in current output without a process of waking up the output control module (or an AP).

In operation 1125, the main electronic device 100 may transmit predefined data (for example, the collection information or processing information) to the output device 1100. Accordingly, the output device 1100 may provide alarm content and screen configuration in operation 1127. For example, the output device 1100 may perform a control to directly display the received predefined data (or the collection information 131) or output the predefined data (or the collection information) to another display device connected to the output device.

In operation 1129, the main electronic device 100 may receive an input relating to an alarm off from a user. In relation to this, the main electronic device 100 may provide an alarm off related icon or menu item. If an alarm off related input occurs, in operation 1131, the main electronic device 100 may transmit an alarm off (or control information for alarm off) to the output device 1100. When receiving an alarm off (or control information for alarm off), the output device 1100 may stop or remove the output of predefined data being outputted. Additionally, the output device 1100 may return to a previous state (for example, a sleep state or a specified program execution state). Alternatively, the output device 1100 may output an activated screen in full screen in response to a wakeup control signal.

Figure 12:
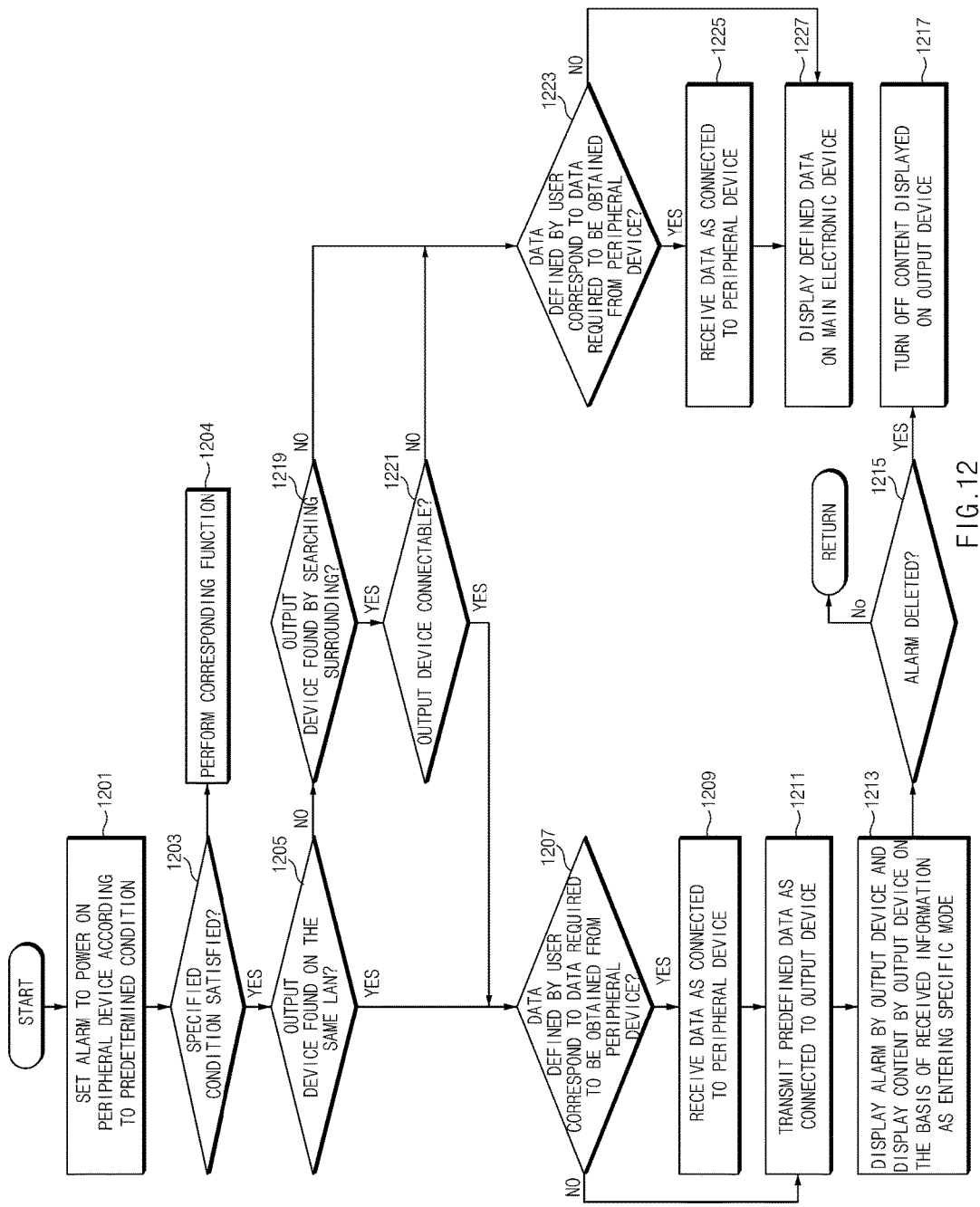
FIG. 12 is a flowchart providing an operational example of a main electronic device operating method depending on an alarm condition according to various embodiments of the present disclosure.

FIG. 12 is a flowchart illustrating exemplary operation of a main electronic device operating method depending on an alarm condition according to various embodiments of the present disclosure.

Referring now to FIG. 12, in relation to the main electronic device operating method, the main electronic device 100 may receive an alarm setting to turn-on (or power-on) a peripheral (or an output) device according to a predetermined condition in operation 1201. In relation to this, the main electronic device 100 may output a setting screen relating to a peripheral device turn-on alarm setting. According to various embodiments of the present disclosure, the main electronic device 100 may output at least one peripheral device list on the basis of a connection history or a user input, and may provide an alarm setting screen when each peripheral device item is selected.

In operation 1203, the main electronic device 100 may check whether a specific condition set in the previous operation is satisfied. If the specific condition is not satisfied, the main electronic device 100 may perform a function supported by the main electronic device 100 in operation 1204. While performing this operation, the main electronic device 100 may monitor operation 1203. When a specified condition is satisfied, the main electronic device 100 may check whether an output device is found on the same LAN in operation 1205. When an output device is found on the same LAN, in operation 1207, the main electronic device 100 may check whether data defined by a user is data required to be obtained from a peripheral device (for example, a sub-electronic device). If the data defined by a user is data (for example, when the characteristics of data relate to data set to be obtained from an external device) required to be obtained from a peripheral device, the main electronic device 100 may perform an operation for receiving data by performing a peripheral device connection in operation 1209. In relation to this, the main electronic device may perform a specified peripheral device discovery and connection attempt and if connected, may automatically transmit a specified information request message to a peripheral device.

In operation 1211, the main electronic device 100 may transmit predefined data in connection with an output device. During this operation, the main electronic device 100 may perform the transmission of predefined data obtained from a peripheral device on the basis of the network address information and device identification information of an output device found on the same LAN. If the data defined by a user is data that is not required to be obtained from a peripheral device in operation 1207, for example, in the case of data obtained according to its function execution, the main electronic device 100 may skip operation 1209. In operation 1213, the main electronic device 100 may perform alarm display and an output device may enter a specific mode and perform content display on the basis of received information.

In operation 1215, the main electronic device 100 may check whether an input signal relating to the deletion of a displayed alarm is received. If there is no alarm deletion input signal occurrence, the main electronic device 100 may return to a specified operation, for example, operation 1211 or operation 1213, and maintain a previous state or may perform a function execution corresponding to a user input. If a displayed alarm deletion input signal occurs, the main electronic device 100 may control the displayed content off of an output device in operation 1217.

If an output device is not found on the same LAN in operation 1205, in operation 1219, the main electronic device 100 may check whether the output device is found by discovering surroundings. If an output device is found, in operation 1221, the main electronic device 100 may check whether the output device is operatively connected to the electronic device. If the output device is operatively connected, the main electronic device 100 may branch into operation 1207 and perform a control to execute subsequent operations.

When an output device discovery is failed in operation 1219 or a connection with the found output device is failed in operation 1221, the main electronic device 100 may check whether data defined by a user is data that is required to be obtained from a peripheral device in operation 1223. When the data defined by a user is data obtained from a peripheral device, in operation 1225, the main electronic device 100 may collect data by performing a peripheral device connection. In operation 1127, the main electronic device 100 may display data defined thereby. During this operation, the main electronic device 100 may output data collected from a peripheral device according to rules defined by the main electronic device 100. For example, the main electronic device 100 may output collected data as collection information as it is or output (for example, output to a first display) processing information in which at least one of size, location, and form is changed (or processed). In operation 1223, if data is not obtained from a peripheral device, the main electronic device 100 may skip operation 1225. Additionally, the main electronic device 100 may stop the output of predefined data (for example, the collection information or processing information) outputted based on specified condition satisfaction, according to a user input or a specified time elapse.

Figure 13:
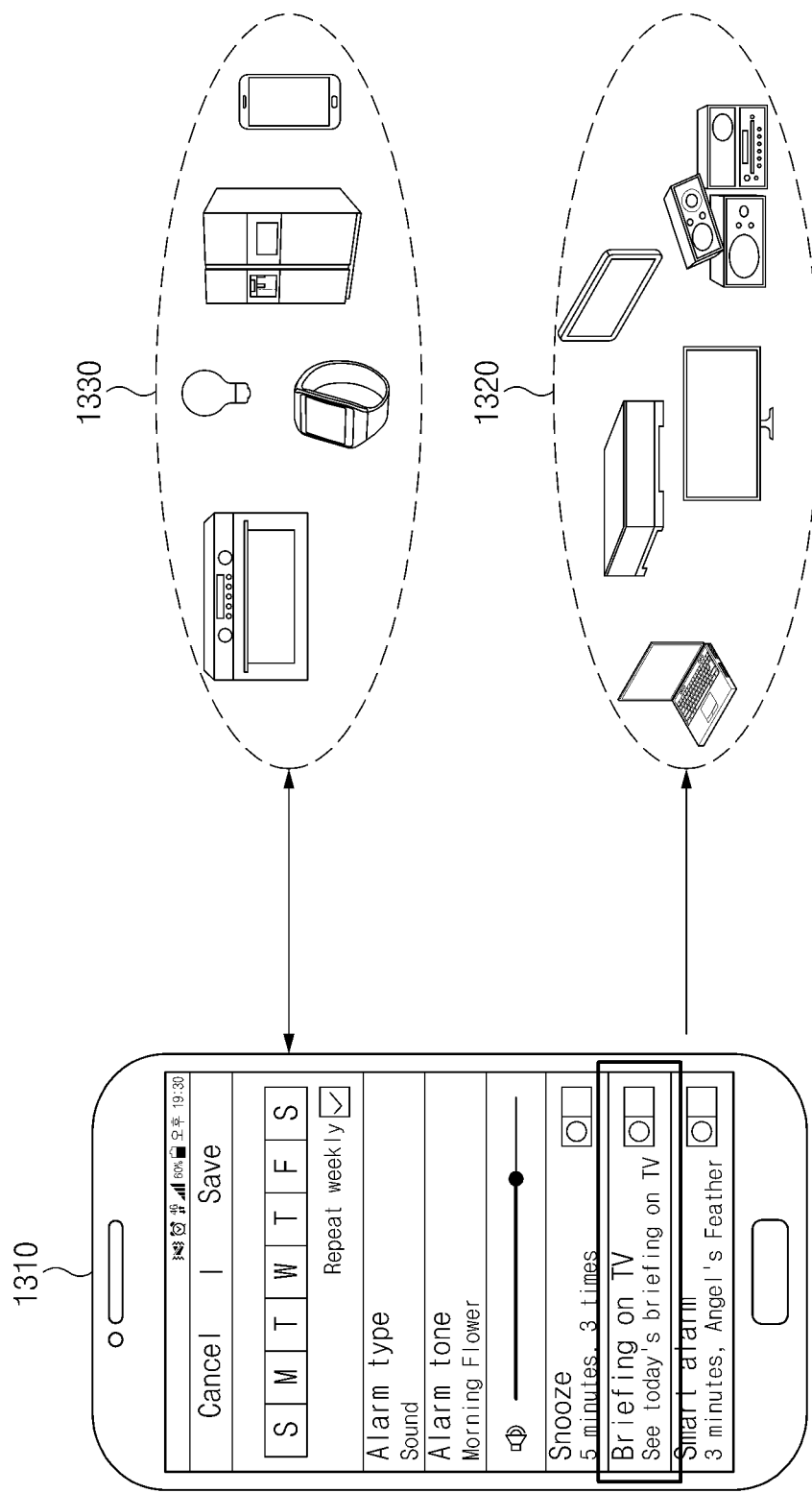
FIG. 13 is a view illustrating an information sharing system according to various embodiments of the present disclosure.

FIG. 13 is a view illustrating an information sharing system according to various embodiments of the present disclosure.

Referring now to FIG. 13, an information sharing system 1300 may include a mobile device 1310 (for example, the main electronic device), at least one media device 1320 (for example, the output device), and at least one peripheral device 1330 (for example, the sub-electronic device). In relation to the information sharing system 1300, when an alarm is triggered, the mobile device 1310 may discover the media device 1320, determine an available connection method, and deliver predefined information after a power control of at least one media device 1320. During this operation, when delivering information to the media device 1320, the mobile device 1310 may deliver alarm information on the basis of the mobile device 1310 and the peripheral device 1330.

The mobile device 1310 may request information from the peripheral device 1330 regarding a specified condition. For example, the mobile device 1310 may discover at least one peripheral device 1330 in correspondence to a specified time or location, or a specified program execution and request specified information transmission from the peripheral device 1330. During this operation, the mobile device 1310 may discover a specified peripheral device among a plurality of peripheral devices according to a specified time, a specified location, and the type of an executed program and perform a specified information collection. The mobile device 1310 may deliver the collected information to at least one media device 1320. During this operation, the mobile device 1310 may transmit collected information to at least one of a plurality of media devices according to at least one of the type of the collected information, an alarm setting condition, and the current time and location. According to various embodiments of the present disclosure, after controlling the power of the media device 1320 to which collection information is to be transmitted, the mobile device 1310 may transmit the collection information.

As shown in the drawing, the mobile device 1310 may output an alarm setting screen. The alarm setting screen, for example, may include a snooze item, a briefing on TV item, and a smart alarm item. When selecting the briefing on TV item, the mobile device 130 may perform information collection and transmission according to a specified condition. According to various embodiments of the present disclosure, when selecting a briefing on TV item, the mobile device 130 may output a screen (for example, a discovery screen of the media device 1320 or at least one peripheral device 1330) for selecting at least one media device 1320 or at least one peripheral device 1330. Additionally, when selecting a briefing on TV item, the mobile device 130 may output a screen relating to at least one condition setting. Alternatively, when selecting a specific device item, the mobile device 130 may output a condition setting screen relating to a corresponding item. The snooze item may be an item relating to a snooze period setting. The smart alarm may be an item for setting image or audio to be outputted during alarm execution.

The media device 1320, for example, may include a notebook PC, a settop box, a TV, a large-screen display device, and an audio output device. The media device 1320, for example, may have a state of connected to a specified network (for example, WiFi network). Alternatively, the media device 1320 may not have an additional specified network connection state and establish a short range communication channel with the mobile device 1310. At least one among a plurality of media devices may receive and output collection information transmitted by the mobile device 1310 according to a condition satisfaction. According to various embodiments of the present disclosure, in relation to the media device 1320, a video device may receive and output video information in collection information and an audio device may receive and output audio information in collection information. Alternatively, a plurality of devices in a media device may differently output collection information received from the mobile device 1310 according to each device state. For example, while a specific media device receives connection information from the mobile device 1310 and outputs it in full screen, another media device may output processing information processed based on the same collection information from the mobile device 1310, to a predetermined area. The media device 1320, for example, may include at least one display device or audio device. Alternatively, the media device 1320 may have a form of including only a display device or an audio device.

The peripheral device 1330, for example, may transmit collection information to the mobile device 1310 in correspondence to a request of the mobile device 1310. The peripheral device 1330, for example, may include various electronic devices such as home appliances, wearable electronic devices, and smartphones. The peripheral device 1330 may collect information according to the unique characteristics of each device. For example, in the case of a microwave or oven among the peripheral devices 1330, collection information may be delivered to the mobile device 1310 according to whether a set cooking time arrives. A lamp device among the peripheral devices 1330 may include a sensor module for sensing an ambient illumination change and when its illumination is changed more than a specified value in correspondence to the ambient illumination change, deliver information relating to a corresponding change as collection information to the mobile device 1310. When whether door is opened/closed, the number of door openings, and a door open/close state satisfy a specified condition, a refrigerator device among the peripheral devices 1330, for example, may transmit a corresponding alarm to the mobile device 1310. Information collected by the peripheral device 1330 may be outputted to at least one media device 1320 by the mobile device 1310.

Figure 14:
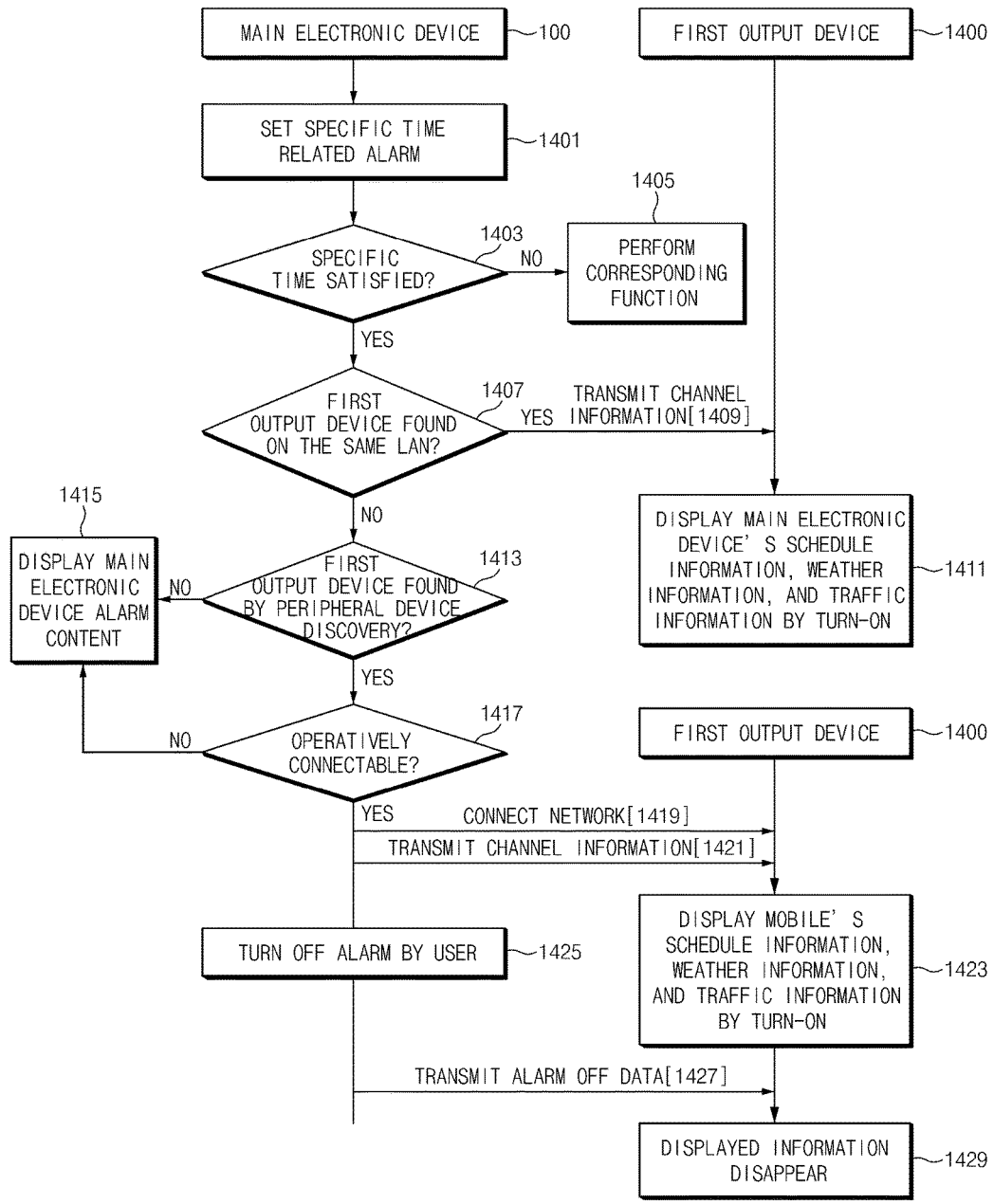
FIG. 14 is a flowchart providing an operational example of a signal flow of an environment including a video output device according to various embodiments of the present disclosure.

FIG. 14 is a flowchart illustrating a signal flow of an environment including a video output device according to various embodiments of the present disclosure.

Referring now to FIG. 14, in operation 1401, the main electronic device 100 may store an alarm setting for a specific time. For example, in relation to the main electronic device 100, an input/output module or an input function may receive an alarm setting relating to the first output device 1400 (for example, a video output device or a video/audio output device) through a display. In relation to the alarm setting, the main electronic device 100 may output an alarm setting screen relating to the first output device 1400.

In operation 1403, the main electronic device 100 may check whether a specific time set in operation 1401 is satisfied (or a specific time arrives). During this operation, if a specific time is not satisfied, in operation 1405, the main electronic device 100 may process a specified function. For example, the main electronic device 100 may support a support available function execution, maintain a sleep state, or maintain a previously performed function, in correspondence to scheduled information.

When a specific time is satisfied, in operation 1407, the main electronic device 100 may check whether the first output device 1400 is found on the same LAN. When the first output device 1400 is found, in operation 1409, the main electronic device 100 may transmit channel information to the first output device 1400. In operation 1411, the first output device 1400 may be turned on (or powered on) and display at least one of schedule information, weather information, and traffic information from the main electronic device 100. Then, the first output device 1400 may process turn-off, channel change, and output stop of information transmitted from the main electronic device 100, in correspondence to a user input or an input from the main electronic device 100.

If the first output device 1400 is not found on the same LAN, the main electronic device 100 may check whether the first output device 1400 is found by performing a peripheral device discovery in operation 1413. During this operation, the main electronic device 100 may perform a discovery on the basis of a specific communication module predefined to communicate with the first output device 1400.

When the first output device 1400 is not found, in operation 1415, the main electronic device 100 may perform a control to display alarm content thereon. When the first output device 1400 is found, in operation 1417, the main electronic device 100 may check whether it is connectible with the first output device 1400. If connection is unavailable, the main electronic device 100 may branch into operation 1415 and perform a control to output alarm content to the main electronic device 100.

When it is connectible with the first output device 1400, in operation 1419, the main electronic device 100 may request a network connection from the first output device 1400. When the first output device 1400 is connected to a network, in operation 1421, the main electronic device 100 may transmit channel information to the first output device 1400. In operation 1411, the first output device 1400 may be turned on and display at least one of schedule information, weather information, and traffic information of the main electronic device 100.

In operation 1425, the main electronic device 100 may receive an input relating to an alarm off from a user. In operation 1427, the main electronic device 100 may transmit received alarm off related data to the first output device 1400. In operation 1429, the first output device 1400 may remove displayed information.

Figure 15:
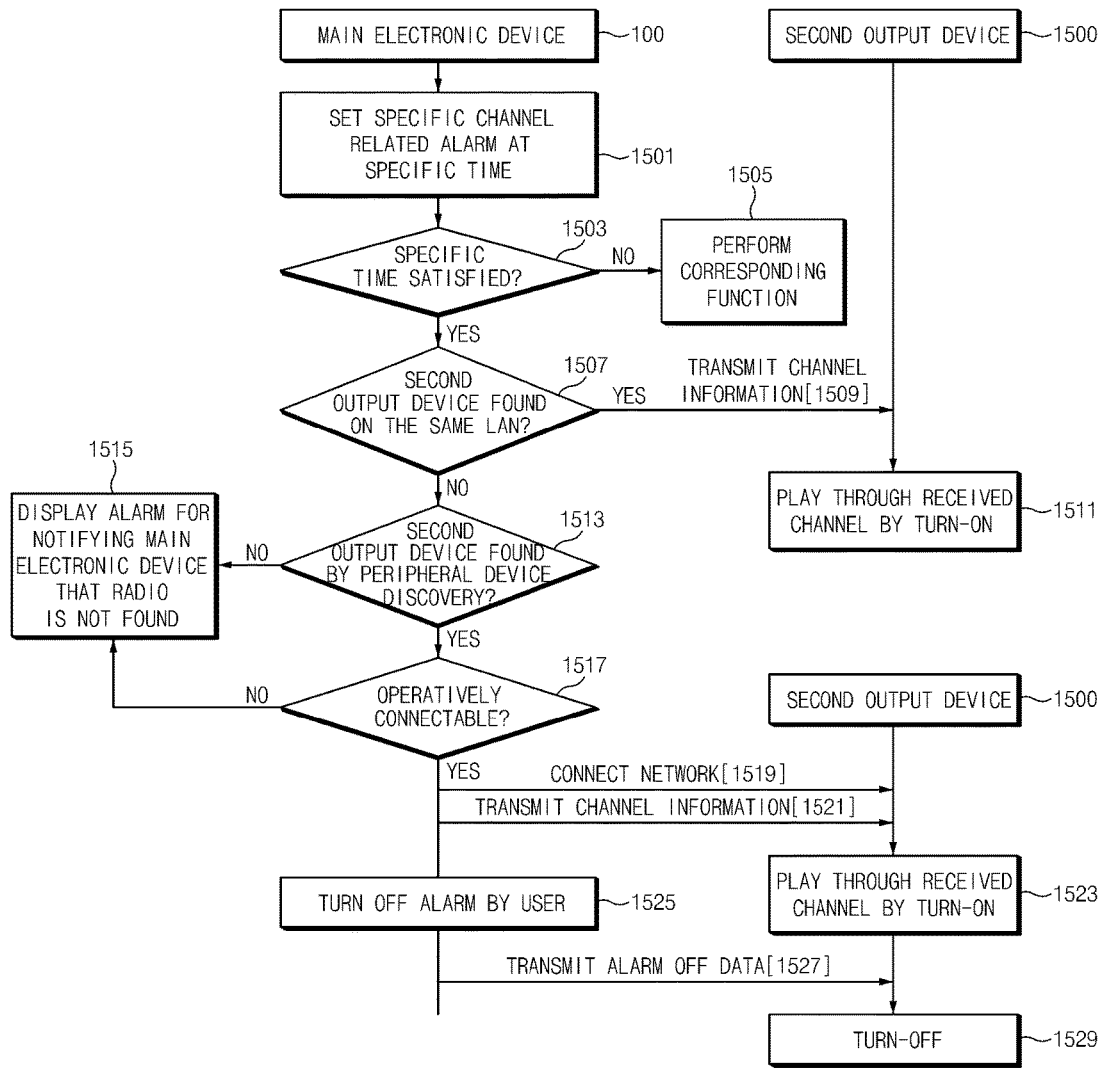
FIG. 15 is a flowchart providing an operational example of a signal flow of an environment including an audio output device according to various embodiments of the present disclosure.

FIG. 15 is a flowchart illustrating a signal flow of an environment including an audio output device according to various embodiments of the present disclosure.

Referring now to FIG. 15, in operation 1501, the main electronic device 100 may store a setting for a specific channel as an alarm at a specific time. In relation to this, the main electronic device 100 may provide an alarm setting screen relating to a second output device 1500. Alternatively, according to various embodiments of the present disclosure, if the second output device 1500 is found by performing a peripheral discovery, an alarm setting screen may be provided automatically. The specific channel, for example, may be an audio (or radio) channel. In operation 1503, the main electronic device 100 may check whether the current time satisfies a specific time (for example, a specific time according to the alarm setting). If the specific time is not satisfied, in operation 1505, the main electronic device 100 may perform a related function. For example, the main electronic device 100 may perform a function according to a user input, perform a function according to preset scheduling information, or maintain a previous state.

When a specific time is satisfied, in operation 1507, the main electronic device 100 may check whether the second output device 1500 is found as being connected to the second output device 1500 on the same LAN. When the second output device 1500 is connected on the same LAN, in operation 1509, the main electronic device 100 may transmit channel information to the second output device 1500. In operation 1511, the second output device 1500 may be turned on and may perform playback through the channel information transmitted from the main electronic device 100. In relation to this, the second output device 1500 may perform auto tuning on the basis of received channel information, and receive and output audio information received from a corresponding channel.

If the second output device 1500 is not found on the same LAN, the main electronic device 100 may check whether the second output device 1500 is found by performing a peripheral device discovery in operation 1513. Herein, the second output device 1500 may be an output device having an alarm set in operation 1501. When the second output device 1500 is not found, in operation 1515, the main electronic device 100 may display, on the display thereof, an alarm notifying that a radio (for example, the second output device) is not found. Although the second output device 1500 is found but it is checked that the second output device 1500 is not operatively connected in operation 1517, the main electronic device 100 may branch into operation 1515 and perform the same function (for example, output a message according to the discovery failure or connection failure of the second output device 1500).

When the second output device 1500 is connected, in operation 1519, the main electronic device 100 may perform a network connection with the second output device 1500. For example, the main electronic device 100 may be connected to the second output device 1500 through a short range communication network. In operation 1521, the main electronic device 100 may transmit channel information to the second output device 1500. In operation 1523, the second output device 1500 may be turned on and perform playback through the received channel information.

In operation 1525, the main electronic device 100 may receive an input relating to an alarm off from a user. In this case, in operation 1527, the main electronic device 100 may transmit alarm off data to the second output device 1500. In operation 1529, the second output device 1500 may transition to an alarm off and turn-off state.

According to various embodiments of the present disclosure, specified information may be more accurately and easily checked in an electronic device that a user wants.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware and firmware and a combination of the two/and firmware. The term "module" and the term "unit", "logic", "logical block", "component", or "circuit" may be interchangeably used and in the present application are all hardware elements. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. The instruction may be set to execute storing collection information and transmitting, to an external electronic device, at least one of the collection information and processing information processed based on the collection information according to whether condition information of stored collection information is satisfied.

According to various embodiments of the present disclosure, a computer storage medium may store at least one instruction stored in a computer-readable storage medium, and the instruction may be set to execute receiving collection information that an external electronic device (for example, a main electronic device) transmits according to a specified condition satisfaction and differently outputting the output form of the collection information in correspondence to at least one of the type of the received collection information and a display state of a display module.

According to various embodiments of the present disclosure, a computer storage medium may store at least one instruction stored in a computer-readable storage medium, and the instruction may be set to execute transmitting display state related information to an external electronic device (for example, a main electronic device), receiving processing information that the external electronic device differently processes according to the display state, and outputting the received processing information.

According to various embodiments of the present disclosure, a computer storage medium may store at least one instruction stored in a computer-readable storage medium, and the instruction may be set to execute receiving condition information relating to a condition satisfaction from an external electronic device (for example, a main electronic device) set to transmit collection information to an output device according to the specified condition satisfaction and performing a control to transmit information corresponding to the received condition information among the collected information to the external electronic device.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. For example, the image processor in the present disclosure, and any references to an input unit and/or an output unit both comprise hardware circuitry configured for operation.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising: at least one communication circuit configured to provide wireless communication;
a processor configured to control the at least one communication circuit; and
a memory communicatively coupled to the processor, the memory configured to store collection information,
wherein the processor performs an output device discovery operation, and if a specific output device is found, the processor attempts to communicatively couple with the specific output device found by the discovery operation using the at least one communication circuit and is further configured to:
receive a state of the specific output device using the at least one communication circuit;
process the collection information by varying at least one of an output size, a display position, a display form, or an output means of the specific output device based on the state, wherein a header of the processed collection information comprises at least one of the output size, the display position, the display form, or the output means of the output device; and wherein the processed collection information was acquired from at least one of previously stored collection information, set condition information, or delivered from a sub-electronic device operatively connected using a second communication circuit;
transmit the processed collection information to the specific output device using the at least one communication circuit; and
control the specific output device to output the processed stored collection information,
wherein the state comprising a turn-on state, a turn-off state, and a specified program execution state,
wherein the header indicates a first display format when the state corresponds to the turn off state, a second display format when the state corresponds to the turn-on state, and a third display format when the state corresponds to the specified program execution state,
wherein the first display format indicates a full screen display and the second display format indicates a partial area display, and
wherein at least one of the output size or the display position of the third display format is different from the first display format and the second display format.

2. The electronic device of claim 1, wherein if the specific output device found by the discovery operation is operatively connected to the electronic device, the processor controls the specific output device to enter into in a state for outputting the processed collection information transmitted by the electronic device.

3. The electronic device of claim 2, wherein if the specific output device is operatively connected to the electronic device, the processor controls a display of the processed collection information by the specific output device.

4. The electronic device of claim 1, wherein the electronic device includes a display, and if the output device discovery operation has failed, the processor controls display of the collection information by the display of the electronic device.

5. The electronic device of claim 1, wherein the electronic device includes a display, and if the output device discovery operation has failed, the processor controls an output of guide information by the display of the electronic device corresponding to the device discovery operation failure.

6. The electronic device of claim 1, wherein in response to a user input, the processor controls transmission of a message to the output device requesting the output device to stop an output of the processed collection information.

7. The electronic device of claim 1, wherein the processed collection information includes at least one of schedule information, weather information, and traffic information.

8. The electronic device of claim 1, wherein the processor receives from the sub-electronic device having a sensor an output of sensing information including at least one of heart rate sensor information, temperature information, humidity information, illumination information, body temperature information, blood flow related information, and oxygen saturation information, which are collected by the sub-electronic device and stored in the memory by the electronic device.

9. The electronic device of claim 1, wherein when the sub-electronic device that executes an exercise function is operatively connected to the electronic device, the processor controls a receipt of exercise related information from the sub-electronic device including at least one of exercise plan information, exercise measurement amount information, and exercise result analysis information, and controls a storage of the exercise related information as the collection information in the memory of the electronic device.

10. The electronic device of claim 1, wherein when the sub-electronic device that executes an exercise function is operatively connected to the electronic device, the processor controls a receipt of exercise related information from the sub-electronic device including at least one of exercise plan information, exercise measurement amount information, and exercise result analysis information, and controls transmitting the exercise related information to the output device.

11. A situation-specific information sharing supporting method comprising:
performing, by an electronic device an output device discovery operation, and if a specified output device is found:
attempting, by the electronic device, an operative connection with the found specified output device:
receiving, by the electronic device, a state of a specified output device, wherein the state comprising a turn-on state, a turn-off state, and a specified program execution state;
processing, by the electronic device, specified collection information by varying at least one of a output size, a display position, a display form, or an output means of the specified output device based on the state, wherein a header of the processed specified collection information comprises at least one of the output size, the display position, the display form, or the output means of the output device and wherein the processed specified collection information was acquired from at least one of previously stored collection information, set condition information, or delivered from a sub-electronic device operatively connected to the electronic device;
checking, by the electronic device, whether a specified condition is satisfied;
if the specified condition is satisfied, changing, by the electronic device, an output state of the specified output device to output of the processed specified collection information; and
transmitting, by the electronic device, the processed specified collection information to the specified output device,
wherein the header indicates a first display format when the state corresponds to the turnoff state, a second display format when the state corresponds to the turn-on state, and a third display format when the state corresponds to the specified program execution state,
wherein the first display format indicates a full screen display and the second display format indicates a partial area display, and
wherein at least one of the output size or the display position of the third display format is different from the first display format and the second display format.

12. The method of claim 11, wherein
if the output device discovery operation has failed, outputting, by the electronic device, guide information corresponding to the device discovery operation failure.

13. The method of claim 12, further comprising, when the attempted operative connection with the output device has failed, displaying the processed specified collection information by the electronic device.

14. The method of claim 11, further comprising collecting, by the electronic device, sensing information received from the sub-electronic device including at least one of a heart rate sensor information, temperature information, humidity information, illumination information, body temperature information, blood flow related information, and oxygen saturation information, which are sensed by a sensor included in the sub-electronic device.

15. The method of claim 14, wherein the transmitting of the processed specified collection information comprises transmitting to the output device, the sensing information from the sub-electronic device that is greater than a specified size.

16. The method of claim 11, wherein the changing of the output state of the specified output device comprises one of:
when the specified output device is connected to a specified network, providing, by an-the electronic device, a control signal to the specified output device to enter into a state for outputting the processed specified collection information through the specified network;
if the specified output device is found, attempting, by an-the electronic device, an operative connection with the specified output device; or
if the output device discovery operation has failed, displaying the processed specified collection information by the electronic device.

17. The method of claim 11, further comprising in response to a user request, transmitting by the electronic device to the specified output device, a message requesting stopping of an output of the processed specified collection information.

18. The method of claim 11, wherein the transmitting of the processed specified collection information by the electronic device comprises transmitting, to the output device the processed specified collection information including at least one of schedule information, weather information, and traffic information.

19. The method of claim 11, further comprising, when the sub-electronic device executing a sensor operation for an exercise function execution is operatively connected to the electronic device, receiving, by the electronic device, exercise related information including at least one of exercise plan information, exercise measurement amount information, and exercise result analysis information from the sub-electronic device and transmitting to the output device the exercise related information as the processed specified collection information.

* * * * *